(12) United States Patent
Vandegrift et al.

(10) Patent No.: US 11,377,818 B2
(45) Date of Patent: Jul. 5, 2022

(54) WORK VEHICLE MAGNETORHEOLOGICAL FLUID JOYSTICK SYSTEMS OPERABLE IN MODIFIED JOYSTICK STIFFNESS MODES

(71) Applicant: Deere & Company, Moline, IL (US)

(72) Inventors: Alex R. Vandegrift, Dubuque, IA (US); Craig Christofferson, Dubuque, IA (US); Amy K. Jones, Asbury, IA (US); Anthony K. Kraft, Epworth, IA (US); Brett S. Graham, Dubuque, IA (US); Christopher R. Benson, Asbury, IA (US); Christopher J. Meyer, Dubuque, IA (US); Kenneth Franck, Dubuque, IA (US); Mark D. Anderson, Dubuque, IA (US); Todd F. Velde, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 5 days.

(21) Appl. No.: 17/002,052

(22) Filed: Aug. 25, 2020

(65) Prior Publication Data
US 2021/0340726 A1 Nov. 4, 2021

Related U.S. Application Data

(60) Provisional application No. 63/019,083, filed on May 1, 2020.

(51) Int. Cl.
*E02F 9/20* (2006.01)
*G05G 1/04* (2006.01)
(Continued)

(52) U.S. Cl.
CPC .......... *E02F 9/2004* (2013.01); *E02F 9/2012* (2013.01); *E02F 9/2029* (2013.01);
(Continued)

(58) Field of Classification Search
CPC .. G05G 1/04; G05G 5/02; G05G 5/03; G05G 5/05; G05G 5/12; G05G 9/047;
(Continued)

(56) References Cited

U.S. PATENT DOCUMENTS

| 7,197,873 B1 | 4/2007 | Windhorst et al. |
| 8,066,567 B2 | 11/2011 | Waggoner et al. |

(Continued)

FOREIGN PATENT DOCUMENTS

| DE | 19848191 A1 | 4/2000 |
| DE | 102004017148 A1 | 1/2005 |

(Continued)

OTHER PUBLICATIONS

Farzad Ahmadkhanlou, Design, Modeling and Control of Magnetorheological Fluid-Based Force Feedback Dampers for Telerobotic Systems, ResearchGate, https://www.researchgate.net/publication/251697638, Apr. 2008. (19 pages).

(Continued)

*Primary Examiner* — Adam D Rogers
(74) *Attorney, Agent, or Firm* — Klintworth & Rozenblat IP LLP

(57) ABSTRACT

Embodiments of a work vehicle magnetorheological fluid (MRF) joystick system include a joystick device having a base housing, a joystick movably mounted to the base housing, and a joystick position sensor configured to monitor joystick movement. An MRF joystick resistance mechanism is controllable to vary a joystick stiffness resisting movement of the joystick relative to the base housing, while a controller architecture is coupled to the joystick position sensor and to the MRF joystick resistance mechanism. The controller architecture is configured to: (i) selectively place the work vehicle MRF joystick system in a modified joystick stiffness mode during operation of the work vehicle; and (ii)

(Continued)

when the work vehicle MRF joystick system is placed in the modified joystick stiffness mode, command the MRF joystick resistance mechanism to vary the joystick stiffness based, at least in part, on the movement of the joystick relative to the base housing.

19 Claims, 7 Drawing Sheets

(51) Int. Cl.
| | |
|---|---|
| G05G 9/02 | (2006.01) |
| G05G 5/03 | (2008.04) |
| G05G 9/047 | (2006.01) |
| E02F 9/26 | (2006.01) |
| G05G 5/12 | (2006.01) |
| G05G 5/02 | (2006.01) |
| F16F 9/53 | (2006.01) |
| G06F 3/01 | (2006.01) |
| E02F 9/24 | (2006.01) |
| G05G 1/015 | (2008.04) |
| F15B 13/01 | (2006.01) |
| G05G 5/05 | (2006.01) |
| E02F 3/32 | (2006.01) |
| E02F 3/76 | (2006.01) |

(52) U.S. Cl.
CPC .............. *E02F 9/24* (2013.01); *E02F 9/265* (2013.01); *F15B 13/01* (2013.01); *F16F 9/535* (2013.01); *G05G 1/015* (2013.01); *G05G 1/04* (2013.01); *G05G 5/02* (2013.01); *G05G 5/03* (2013.01); *G05G 5/05* (2013.01); *G05G 5/12* (2013.01); *G05G 9/047* (2013.01); *G06F 3/016* (2013.01); *E02F 3/32* (2013.01); *E02F 3/7609* (2013.01); *E02F 3/7636* (2013.01); *E02F 9/261* (2013.01); *G05G 2009/04751* (2013.01); *G05G 2009/04766* (2013.01); *G05G 2505/00* (2013.01)

(58) Field of Classification Search
CPC .......... G05G 2009/04707; G05G 2009/04751; G05G 2009/04766; E02F 9/2004; F16F 9/535

See application file for complete search history.

(56) References Cited

U.S. PATENT DOCUMENTS

| | | | | |
|---|---|---|---|---|
| 8,972,125 | B1* | 3/2015 | Elliott | A01B 69/00 701/50 |
| 9,141,126 | B2 | 9/2015 | Hynes et al. | |
| 9,181,676 | B2 | 11/2015 | Meislahn et al. | |
| 9,341,258 | B1 | 5/2016 | Templin | |
| 9,771,705 | B2 | 9/2017 | Horstman et al. | |
| 9,777,460 | B2 | 10/2017 | Wuisan et al. | |
| 9,777,461 | B2 | 10/2017 | Wuisan et al. | |
| 9,797,114 | B2 | 10/2017 | Maifield et al. | |
| 10,061,343 | B2 | 8/2018 | Fredrickson et al. | |
| 10,145,084 | B2 | 12/2018 | Fredrickson | |
| 11,048,330 | B2* | 6/2021 | Eck | G06F 3/0414 |
| 11,086,350 | B2* | 8/2021 | Wakuda | G06F 3/0354 |
| 2001/0052893 | A1 | 12/2001 | Jolly et al. | |
| 2003/0098196 | A1 | 5/2003 | Yanaka | |
| 2004/0221674 | A1 | 11/2004 | Kornelson | |
| 2006/0197741 | A1 | 9/2006 | Biggadike | |
| 2011/0005344 | A1 | 1/2011 | Haevescher | |
| 2013/0229272 | A1* | 9/2013 | Elliott | G05G 9/047 340/407.2 |
| 2016/0179128 | A1 | 6/2016 | Guglielmo | |
| 2018/0058039 | A1 | 3/2018 | Fredrickson et al. | |
| 2019/0210854 | A1 | 7/2019 | Eck et al. | |
| 2019/0286237 | A1 | 9/2019 | Eck et al. | |
| 2020/0125132 | A1 | 4/2020 | Wakuda et al. | |
| 2021/0286431 | A1* | 9/2021 | Eck | G06F 3/016 |
| 2021/0340723 | A1* | 11/2021 | Velde | G05G 9/047 |
| 2021/0340724 | A1* | 11/2021 | Kenkel | E02F 9/2029 |
| 2021/0340725 | A1* | 11/2021 | Velde | G05G 9/047 |
| 2021/0340728 | A1* | 11/2021 | Graham | G05G 9/047 |
| 2021/0341032 | A1* | 11/2021 | Velde | F16F 9/535 |
| 2021/0341033 | A1* | 11/2021 | Breutzman | F16F 9/535 |
| 2021/0341960 | A1* | 11/2021 | Kenkel | G05G 9/047 |

FOREIGN PATENT DOCUMENTS

| | | |
|---|---|---|
| DE | 102004041690 A1 | 3/2005 |
| DE | 112009003181 T5 | 1/2012 |
| DE | 112013001281 T5 | 7/2019 |
| DE | 102020104810 A1 | 2/2021 |
| JP | 2014174726 A * | 9/2014 |
| KR | 20190074555 A | 6/2019 |
| WO | 9642078 A1 | 12/1996 |
| WO | 2015009161 A1 | 1/2015 |

OTHER PUBLICATIONS

Deere & Company, John Deere Motor Grader Left Dual Joystick Controls Tutorial, https://www.youtube.com/watch?v=iYxPlxzD8g4 &feature=youtu.be&t=25, Mar. 7, 2017. (2 pages).

MRF Damper, FMR-70S-403 Brochure, undated admitted prior art. (3 pages).

Deere & Company, pending U.S. Appl. No. 63/019,083, filed May 1, 2020.

Deere & Company, pending Utility U.S. Appl. No. 16/864,696, filed May 1, 2020.

Deere & Company, pending Utility U.S. Appl. No. 16/864,726, filed May 1, 2020.

Deere & Company, pending Utility U.S. Appl. No. 16/864,749, filed May 1, 2020.

Deere & Company, pending Utility U.S. Appl. No. 16/916,800, filed Jun. 3, 2020.

Deere & Company, pending Utility U.S. Appl. No. 16/922,321, filed Jul. 7, 2020.

Deere & Company, pending Utility U.S. Appl. No. 16/989,427, filed Aug. 10, 2020.

Deere & Company, pending Utility U.S. Appl. No. 17/038,399, filed Sep. 20, 2020.

Non-Final Office Action issued in Utility U.S. Appl. No. 16/864,696 dated Sep. 16, 2021.

German Search Report issued in application No. DE102021203343.1 dated Dec. 2, 2021 (05 pages).

German Search Report issued in application No. DE102021203189.7 dated Dec. 1, 2021 (04 pages).

German Search Report issued in application No. DE102021203250.8 dated Dec. 2, 2021 (04 pages).

German Search Report issued in application No. DE102021202960.4 dated Dec. 1, 2021 (04 pages).

German Search Report issued in application No. DE102021203367.9 dated Dec. 1, 2021 (05 pages).

German Search Report issued in application No. DE102021203807.7 dated Jan. 26, 2022 with English translation (11 pages).

German Search Report issued in application No. DE102021203860.3 dated Jan. 28, 2022 with English translation (11 pages).

* cited by examiner

WORK VEHICLE MAGNETORHEOLOGICAL FLUID JOYSTICK SYSTEMS OPERABLE IN MODIFIED JOYSTICK STIFFNESS MODES

CROSS-REFERENCE TO RELATED APPLICATION(S)

This application claims priority to U.S. provisional application Ser. No. 63/019,083, filed with the United Stated Patent and Trademark Office on May 1, 2020.

STATEMENT OF FEDERALLY SPONSORED RESEARCH OR DEVELOPMENT

Not applicable.

FIELD OF THE DISCLOSURE

This disclosure relates to work vehicle magnetorheological fluid (MRF) joystick systems, which are operable in modified joystick stiffness modes.

BACKGROUND OF THE DISCLOSURE

Joystick devices are commonly utilized to control various operational aspects of work vehicles employed within the construction, agriculture, forestry, and mining industries. For example, in the case of a work vehicle equipped with a boom assembly, an operator may utilize one or more joystick devices to control boom assembly movement and, therefore, movement of a tool or implement mounted to an outer terminal end of the boom assembly. Common examples of work vehicles having such joystick-controlled boom assemblies include excavators, feller bunchers, skidders, tractors (on which modular front end loader and backhoe attachments may be installed), tractor loaders, wheel loaders, and various compact loaders. Similarly, in the case of dozers, motor graders, and other work vehicles equipped with earth-moving blades, an operator may utilize with one or more joysticks to control blade movement and positioning. Joystick devices are also commonly utilized to steer or otherwise control the directional movement of the work vehicle chassis in the case of motor graders, dozers, and certain loaders, such as skid steer loaders. Given the prevalence of joystick devices within work vehicles, taken in combination with the relatively challenging, dynamic environments in which work vehicles often operate, a continued demand exists for advancements in the design and function of work vehicle joystick systems, particularly to the extent that such advancements can improve the safety and efficiency of work vehicle operation.

SUMMARY OF THE DISCLOSURE

A work vehicle magnetorheological fluid (MRF) joystick system is disclosed for usage onboard a work vehicle. In embodiments, the work vehicle MRF joystick system includes a joystick device having a base housing, a joystick movably mounted to the base housing, and a joystick position sensor configured to monitor movement of the joystick relative to the base housing. An MRF joystick resistance mechanism is controllable to vary a joystick stiffness resisting movement of the joystick relative to the base housing in at least one degree of freedom, while a controller architecture is coupled to the joystick position sensor and to the MRF joystick resistance mechanism. The controller architecture is configured to: (i) selectively place the work vehicle MRF joystick system in a modified joystick stiffness mode during operation of the work vehicle; and (ii) when the work vehicle MRF joystick system is placed in the modified joystick stiffness mode, command the MRF joystick resistance mechanism to vary the joystick stiffness based, at least in part, on the movement of the joystick relative to the base housing.

In further embodiments, the work vehicle MRF includes a joystick device, an MRF resistance mechanism, and a controller architecture. The joystick device includes, in turn, a base housing, a joystick movably mounted to the base housing, at least one resilient element within the base housing and exerting a bias force on the joystick urging return of the joystick to a center position when displaced therefrom, and a joystick position sensor configured to monitor movement of the joystick relative to the base housing. The MRF joystick resistance mechanism is controllable to vary a joystick stiffness resisting movement of the joystick relative to the base housing in at least one degree of freedom. Coupled to the joystick position sensor and to the MRF joystick resistance mechanism, the controller architecture is configured to control the MRF joystick stiffness mechanism to: (i) permit return of the joystick to the center position solely under the influence of the bias force when the work vehicle MRF joystick system operates in a first joystick stiffness mode; and (ii) prevent return of the joystick to the center position solely under the influence of the bias force when the work vehicle MRF joystick system operates in a second joystick stiffness mode.

The details of one or more embodiments are set-forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures.

Figure 1:
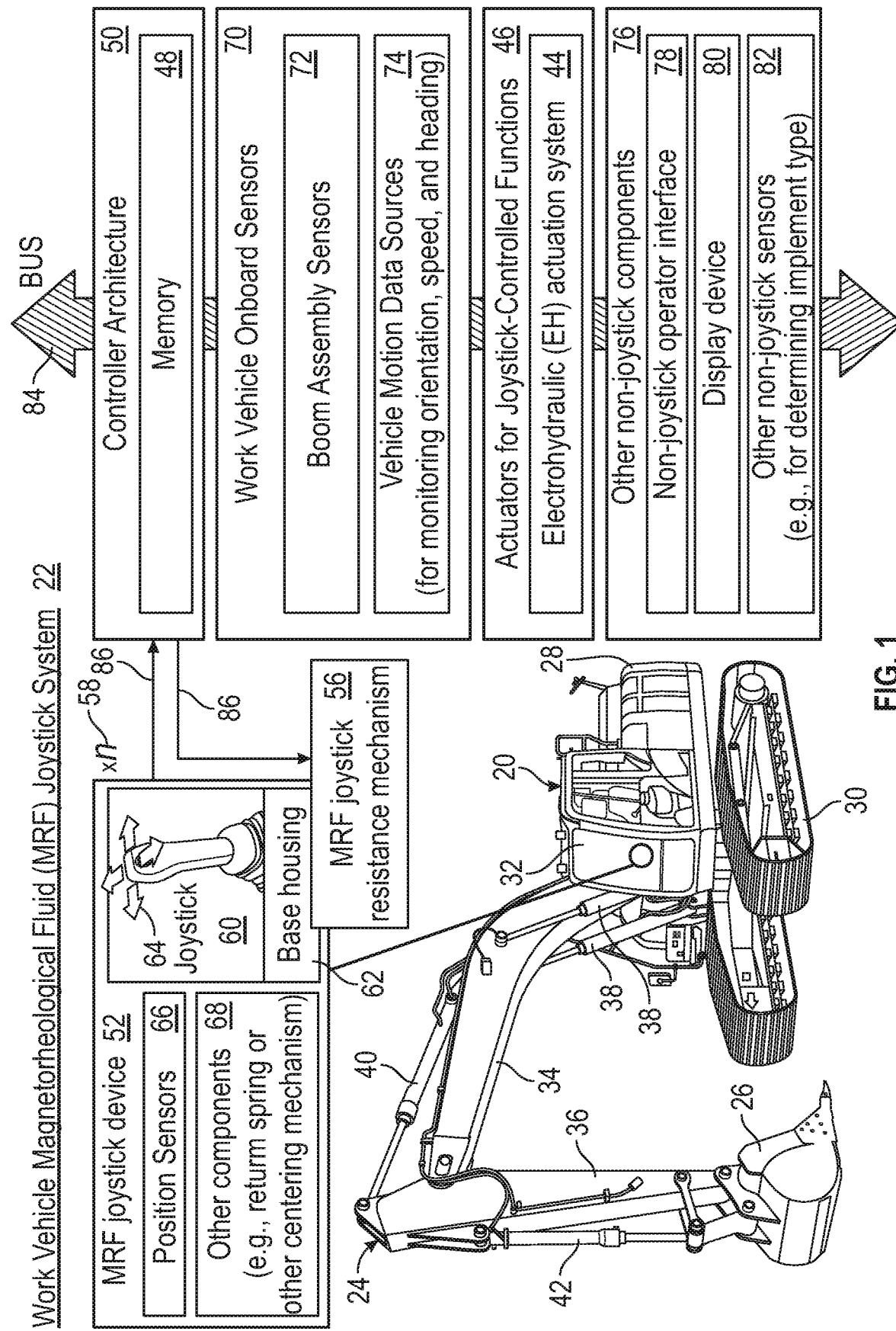
FIG. 1 is a schematic of an example magnetorheological fluid (MRF) joystick system onboard a work vehicle (here, an excavator) and operable in at least one modified joystick stiffness mode, as illustrated in accordance with an example embodiment of the present disclosure.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as setforth the appended claims.

Overview

The following describes work vehicle magnetorheological fluid (MRF) joystick systems operable in modified joystick stiffness modes. As appearing herein, the term "modified joystick stiffness mode" refers to a mode of operation in which an MRF joystick system alters the behavior of a joystick device (relative to a default mode of operation) through the controlled generation of an MRF-applied resistance force impeding joystick motion in at least one degree of freedom (DOF). To this end, embodiments of the below-described work vehicle MRF joystick system include a processing sub-system or "controller architecture," which is operably coupled to an MRF joystick resistance mechanism; that is, a mechanism, device, or damper containing a magnetorheological fluid and capable of modifying the rheology (viscosity) of the fluid through variations in the strength of an electromagnetic (EM) field to provide controlled adjustments to a resistive force impeding joystick motion. This joystick-impeding resistive force is generally referred to herein as an "MRF resistance force," while the degree to which an MRF resistance force impedes joystick motion in a particular direction or combination of directions is referred to herein as a "joystick stiffness." Depending upon implementation, the MRF joystick resistance mechanism may be controlled by the controller architecture to apply various different resistive effects selectively impeding or inhibiting joystick movement in any given direction, over any given range of motion (ROM) of the joystick, and through the application of varying magnitudes of resistive force.

Embodiments of the MRF joystick system contain at least one MRF joystick device, which includes a joystick movable relative to a base housing in at least one DOF. In embodiments in which a joystick is movable relative to a base housing in multiple DOFs, the MRF joystick system may be capable of increasing joystick stiffness in a single DOF or, instead, of independently increasing joystick stiffness in multiple DOFs of the joystick. For example, in implementations in which a given joystick is rotatable relative to its base housing about two perpendicular axes, the MRF joystick resistance mechanism may be capable of independently increasing the MRF resistance forces inhibiting joystick rotation (and therefore the joystick stiffness) about either or both of the joystick's rotational axes. Accordingly, in such instances, the controller architecture may command the MRF joystick system to independently vary first and second joystick stiffnesses resisting rotation of the joystick about first and second axes, respectively, to provide a desired resistive effect or joystick behavior. In this manner, the controller architecture of the MRF joystick system may monitor joystick position and selectively command the MRF joystick resistance mechanism to limit the joystick ROM in a predetermined manner in certain instances or modes of operation; e.g., to temporarily restrict the joystick's ROM to movement along a particular axis or in a particular direction, to selectively limit joystick motion to a predefined track or movement pattern (e.g., an H-shaped or plus-shaped track), or to alter the behavior of the joystick in another manner when the MRF joystick system operates in the default joystick stiffness mode or in a modified joystick stiffness mode.

In at least some implementations, the controller architecture may command the MRF joystick resistance mechanism to generate localized regions of increased resistance (herein, "MRF detents"), which are encountered as a joystick is moved into a particular position. When the joystick is self-centering (that is, biased to return to a neutral or center position when moved therefrom by an operator), the MRF detents can be generated to exert an MRF resistive force sufficient to overcome the bias or "centering" force exerted on the joystick, preventing return of the joystick to its center position absent an additional operator-applied force applied to the joystick. MRF detents of this type are referred to more specifically herein as "hold detents." In other instances, an MRF detent may be generated at a lower MRF resistive force, which is perceptible to the work vehicle operator manipulating a self-centering joystick, while also being insufficient to prevent return of the self-centering joystick to its center position solely under the influence of the joystick's centering force. MRF detents of this latter type are referred to herein as "feel detents." When the work vehicle MRF joystick system is placed in a particular joystick stiffness mode, the controller architecture may command the MRF joystick resistance mechanism to generate such MRF detents (whether hold detents, feel detents, or a combination thereof) at any number of predetermined joystick positions, at varying intensities, and for a variety of purposes, as further discussed below. In other implementations, the controller architecture may not cause the generation of MRF detents in the below-described joystick stiffness modes; or the controller architecture may permit a work vehicle operator to selectively activate and deactivate the MRF detents (and possibly assign various functions to the MRF detents), as desired.

The above-described MRF-applied changes in joystick behavior may be implemented by the controller architecture in accordance with one or more joystick stiffness modification algorithms or control schemes, which are stored in a local memory onboard the work vehicle. In embodiments in which the MRF joystick system is operable in multiple modified stiffness modes, a corresponding number of joystick stiffness modification algorithms may be stored in the memory accessible to the controller architecture. During operation, the work vehicle MRF joystick system may normally operate in a default or non-modified joystick stiffness mode and transition to operation in a particular modified joystick stiffness when appropriate; e.g., in response to the occurrence of a predefined trigger event. The trigger event can be, for example, operator input requesting entry into a particular modified joystick stiffness mode, usage of the work vehicle to perform a particular type of work task (as inferred from operator input or sensor data), entry of the work vehicle into a travel mode in which joystick movement is utilized to steer or otherwise control propulsion of a work vehicle, and other such predefined events, additional examples of which are described below. When operating in the modified joystick stiffness mode, the controller architecture then commands the MRF joystick resistance mechanism to selectively vary the joystick stiffness based, at least in part, on movement of the joystick relative to the base housing in accordance with the joystick stiffness modification algorithm. The manner in which the joystick resistance behaviors are adjusted when the MRF joystick system operates in the modified joystick stiffness mode will vary based on a wide range of factors including, in particular, the particular type of work vehicle into which the MRF joystick system is integrated (herein, the "host work vehicle") and the joystick-controlled functions of the host work vehicle.

As briefly indicated above, embodiments of the controller architecture may selectively place the work vehicle MRF joystick system in a modified joystick stiffness mode when one or more MRF joystick devices are utilized to steer and/or control the propulsion of the host work vehicle. For example, in implementations in which a self-centering joystick is utilized to steer a work vehicle, such an excavator or other work vehicle placed in a travel mode, the controller architecture may command the MRF joystick resistance mechanism to selectively increase the joystick stiffness to a degree sufficient to prevent return of the joystick to its center position solely under influence of the joystick's inherent bias force. This may be useful in implementations in which an operator is permitted to select between velocity-based and positioned-based joystick steering schemes, with the controller architecture allowing the joystick to return to the self-centering position when the velocity-based joystick steering scheme is selected. Similarly, in the case of dozers and other work vehicles capable of operating in a creep mode (that is, a mode permitting fine adjustment of the work vehicle speed over a limited speed range), the work vehicle MRF joystick system may transition into operation in a modified joystick stiffness mode when the work vehicle is placed in creep mode. In this latter case, the controller architecture may command the MRF joystick system to enable push-pull joystick operation for work vehicle travel, while one or more MRF detents are generated to assist an operator in piloting the work vehicle when in creep mode; e.g., one or more hold detents may be generated to maintain the joystick in an operator-commanded position as the work vehicle creeps in forward or rearward directions.

In additional implementations of the work vehicle MRF joystick system, the controller architecture may place the MRF joystick system in a modified joystick stiffness mode in response to attachment of a particular type of interchangeable implement or tool to the work vehicle. The particular type of implement currently attached to the work vehicle may be automatically determined by sensors onboard the work vehicle, or an operator may enter information specifying the currently-attached implement type. When the controller architecture then places the MRF joystick system in a particular joystick stiffness mode in response to attachment (or usage) of a particular type of work implement, the controller architecture may selectively vary joystick stiffness through appropriate commands transmitted to the MRF joystick resistance mechanism to adapt joystick behavior to best suit the newly-attached work implement. As specific, non-limiting example, the controller architecture may modify the joystick ROM based upon the characteristics of the work implement, such as the number of joystick-controlled functionalities of the implement. In this regard, MRF joystick rotation may be restricted to a single axis in the case of implements movable in a single DOF or otherwise capable of performing a single function, such as in the case of simple buckets. Conversely, for implements capable of multi-DOF movements or otherwise capable of performing multiple functions (e.g., as in the case of a multi-purpose or 4-in-1 bucket), the MRF joystick system may enable rotation of the joystick about two substantially perpendicular axes or tracks, with joystick motion along each track controlling or "mapped to" a different function of the work implement.

In still further embodiments, the controller architecture may place the MRF joystick system in a modified joystick stiffness mode in response to the occurrence of variuos other events or control modalities of the work vehicle. Consider, for example, a work vehicle equipped with an electrohydraulic (EH) actuation system animating the movement of a boom assembly, such as a hinged boom assembly of an excavator, a Front End Loader (FEL) assembly of a loader, or an FEL attachment mounted to a tractor. Often, such an EH actuation system may be operable in multiple different control modes, such as a lift mode and a pressure boost mode. In such instances, the controller architecture may place the MRF joystick system in a modified joystick stiffness mode when the lift mode or the pressure boost mode of the EH actuation system is activated to, for example, decrease the overall joystick stiffness to provide a tactile cue to the operator indicating that additional hydraulic power has temporarily availed for controlling the boom assembly. Still further examples of such trigger events or conditions for placing the work vehicle MRF joystick system in a particular modified joystick stiffness mode are discussed below, as are various manners in which the joystick behavior may be altered when the MRF joystick system operates in a given modified joystick stiffness mode. A non-exhaustive list of other trigger events or work vehicle conditions that may trigger entry of the MRF joystick system into an associated modified joystick stiffness mode include usage of certain work vehicles (e.g., motor graders and dozers) to perform grading tasks, personalization or customization of joystick behaviors (e.g., joystick stiffness, joystick ROM, the presence of MRF detents, and so on) by an operator, placement of certain work vehicles (e.g., a loader) in a particular performance mode, calibration of certain work vehicle functions, and entry into an optimal speed mode in which an operator is encouraged (through MRF-applied tactile cues) to maintain a joystick in a position maintaining work vehicle speed at a level to optimize a particular work vehicle parameter, such as fuel efficiency.

An example embodiment of a work vehicle MRF joystick system will now be described in conjunction with FIGS. 1-6. In the below-described example embodiment, the MRF joystick system is principally discussed in the context of a particular type of work vehicle, namely, an excavator. Additionally, in the following example, the MRF joystick system includes two joystick devices, which each have a joystick rotatable about two perpendicular axes and which are utilized to control movement of the excavator boom assembly and the implement (e.g., bucket, grapple, or hydraulic hammer) attached thereto. The following example notwithstanding, the MRF joystick system may include a greater or lesser number of joysticks in further embodiments, with each joystick device movable in any number of DOFs and along any suitable motion pattern; e.g., in alternative implementations, a given joystick device may be rotatable about a single axis or, perhaps, movable along a limited (e.g., H-shaped or plus-shaped) track or motion pattern. Moreover, the below-described MRF joystick system can be deployed on wide range of work vehicles having joystick-controlled functions, additional examples of which are discussed below in connection with FIG. 7.

Example MRF Joystick System Operable in Modified Joystick Stiffness Modes

Referring initially to FIG. 1, an example work vehicle (here, an excavator 20) equipped with a work vehicle MRF joystick system 22 is presented. In addition to the MRF joystick system 22, the excavator 20 includes a boom assembly 24 terminating in a tool or implement, such a bucket 26. Various other implements can be interchanged with the bucket 26 and attached to the terminal end of the boom assembly 24 including, for example, other buckets, grapples, and hydraulic hammers. The excavator 20 features a body or chassis 28, a tracked undercarriage 30 supporting the chassis 28, and a cabin 32 located at forward portion of the chassis 28 and enclosing an operator station. The excavator boom assembly 24 extends from the chassis 28 and contains, as principal structural components, an inner or proximal boom 34 (hereafter, "the hoist boom 34"), an outer or distal boom 36 (hereafter, "the dipperstick 36"), and a number of hydraulic cylinders 38, 40, 42. The hydraulic cylinders 38, 40, 42 include, in turn, two hoist cylinders 38, a dipperstick cylinder 40, and a bucket cylinder 42. Extension and retraction of the hoist cylinders 38 rotates the hoist boom 34 about a first pivot joint at which the hoist boom 34 is joined to the excavator chassis 28, here at location adjacent (to the right of) the cabin 32. Extension and retraction of the dipperstick cylinder 40 rotates the dipperstick 36 about a second pivot joint at which the dipperstick 36 is joined to the hoist boom 34. Finally, extension and retraction of the bucket cylinder 42 rotates or "curls" the excavator bucket 26 about a third pivot joint at which the bucket 26 is joined to the dipperstick 36.

The hydraulic cylinders 38, 40, 42 are included in an electrohydraulic (EH) actuation system 44, which is encompassed by a box 46 entitled "actuators for joystick-controlled functions" in FIG. 1. Movements of the excavator boom assembly 24 are controlled utilizing at least one joystick located within the excavator cabin 32 and included in the MRF joystick system 22. Specifically, an operator may utilize the joystick or joysticks included in the MRF joystick system 22 to control the extension and retraction of the hydraulic cylinders 38, 40, 42, as well as to control the swing action of the boom assembly 24 via rotation of the excavator chassis 28 relative to the tracked undercarriage 30. The depicted EH actuation system 44 also contains various other non-illustrated hydraulic components, which may include flow lines (e.g., flexible hoses), check or relief valves, pumps, fittings, filters, and the like. Additionally, the EH actuation system 44 contains electronic valve actuators and flow control valves, such as spool-type multi-way valves, which can be modulated to regulate the flow of pressurized hydraulic fluid to and from the hydraulic cylinders 38, 40, 42. This stated, the particular construction or architecture of the EH actuation system 44 is largely inconsequential to embodiments of the present disclosure, providing that the below-described controller architecture 50 is capable of controlling movement of the boom assembly 24 via commands transmitted to selected ones of the actuators 46 effectuating the joystick controlled functions of the excavator 20.

As schematically illustrated in an upper left portion of FIG. 1, the work vehicle MRF joystick system 22 contains one or more MRF joystick devices 52, 54. As appearing herein, the term "MRF joystick device" refers to an operator input device including at least one joystick or control lever, the movement of which can be impeded by a variable resistance force or "stiffness force" applied utilizing an MRF joystick resistance mechanism of the type described herein. While one such MRF joystick device 52 is schematically shown in FIG. 1 for clarity, the MRF joystick system 22 can include any practical number of joystick devices, as indicated by symbol 58. In the case of the example excavator 20, the MRF joystick system 22 will typically include two joystick devices; e.g., joystick devices 52, 54 described below in connection with FIG. 2. The manner in which two such joystick devices 52, 54 may be utilized to control movement of the excavator boom assembly 24 is further discussed below. First, however, a general discussion of the joystick device 52, as schematically illustrated in FIG. 1, is provided to establish a general framework in which embodiments of the present disclosure may be better understood.

As schematically illustrated in FIG. 1, the MRF joystick device 52 includes a joystick 60 mounted to a lower support structure or base housing 62. The joystick 60 is movable relative to the base housing 62 in at least one DOF and may be rotatable relative to the base housing 62 about one or more axes. In the depicted embodiment, and as indicated by arrows 64, the joystick 60 of the MRF joystick device 52 is rotatable relative to the base housing 62 about two perpendicular axes and will be described below as such. The MRF joystick device 52 includes one or more joystick position sensors 66 for monitoring the current position and movement of the joystick 60 relative to the base housing 62. Various other components 68 may also be included in the MRF joystick device 52 including buttons, dials, switches, or other manual input features, which may be located on the joystick 60 itself, located on the base housing 62, or a combination thereof. Spring elements (gas or mechanical), magnets, or fluid dampers may be incorporated into the joystick device 52 to provide a desired rate of return to a home position of the joystick, as well as to fine-tune the desired feel of the joystick 60 perceived by an operator when interacting with the MRF joystick device 52. Such mechanisms are referred to herein as "joystick bias mechanisms" and may be contained within in the MRF joystick device 52 when having a self-centering design. In more complex components, various other components (e.g., potentially including one or more artificial force feedback (AFF) motors) can also be incorporated into the MRF joystick device 52. In other implementations, such components may be omitted from the MRF joystick device 52.

An MRF joystick resistance mechanism 56 is at least partially integrated into the base housing 62 of the MRF joystick device 52. The MRF joystick resistance mechanism 56 can be controlled to adjust the MRF resistance force and, therefore, joystick stiffness resisting joystick motion relative to the base housing 62 in at least one DOF. During operation of the MRF joystick system 22, the controller architecture 50 may selectively command the MRF joystick resistance mechanism 56 to increase the joystick stiffness impeding joystick rotation about a particular axis or combination of axes. As discussed more fully below, the controller architecture 50 may command the MRF joystick resistance mechanism 56 to increase joystick stiffness, when appropriate to perform any one of a number of enhanced joystick functionalities, by increasing the strength of an EM field in which a magnetorheological fluid contained in the mechanism 56 is at least partially immersed. A generalized example of one manner in which the MRF joystick resistance mechanism 56 may be realized is described below in connection with FIGS. 3 and 4.

The excavator 20 is further equipped with any number of onboard sensors 70. Such sensors 70 may include sensors contained in an obstacle detection system, which may be integrated into the excavator 20 in embodiments. The non-joystick input sensors 70 may further include any number and type of boom assembly tracking sensors 72 suitable for tracking the position and movement of the excavator boom assembly 24. Such sensors can include rotary or linear variable displacement transducers integrated into excavator boom assembly 24 in embodiments. For example, in one possible implementation, rotary position sensors may be integrated into the pivot joints of the boom assembly 24; and the angular displacement readings captured by the rotary position sensors, taken in conjunction with known dimensions of the boom assembly 24 (as recalled from the memory 48), may be utilized to track the posture and position of the boom assembly 24 (including the bucket 26) in three dimensional space. In other instances, the extension and retraction of the hydraulic cylinders 38, 40, 42 may be measured (e.g., utilizing linear variable displacement transducers) and utilized to calculate the current posture and positioning of the excavator boom assembly 24. Other sensor inputs can also be considered by the controller architecture 50 in addition or in lieu of the aforementioned sensor readings, such as inertia-based sensor readings; e.g., as captured by inertia sensors, such as MEMS gyroscopes, accelerometers, and possibly magnetometers packaged as IMUs, which are affixed to the excavator 20 at various locations. For example, IMUs can be affixed to the excavator chassis 28 and one or more locations (different linkages) of the excavator boom assembly 24. Vision systems capable of tracking of the excavation implement or performing other functions related to the operation of the excavator 20 may also be included in the onboard board sensors 70 when useful in performing the functions described below.

One or more load measurement sensors, such as weight- or strain-based sensors, may further be included in the non-joystick sensor inputs 70 in at least some implementations of the work vehicle MRF joystick system 22. In embodiments, such load measurement sensors may be utilized to directly measure the load carried by the bucket 26 (generally, a "load-moving implement") at any given time during excavator operation. The load measurement sensors can also measure other parameters (e.g., one or more hydraulic pressures within the EH actuation system 44) indicative of the load carried by the boom assembly 24 in embodiments. In other realizations, the MRF joystick system 22 may be integrated into a work vehicle having a bed or tank for transporting a material, such as the bed of an articulated dump truck. In this latter case, the load measurement sensors 76 may assume the form of payload weighing sensors capable of weighing or approximating the weight of material carried within the bed or tank of the work vehicle at any particular juncture in time.

In embodiments, the disturbance force sensors 70 further include a number of vehicle motion data sources 74. The vehicle motion data sources 74 can include any sensors or data sources providing information pertaining to changes in the position, speed, heading, or orientation of the excavator 20. Again, MEMS gyroscopes, accelerometers, and possibly magnetometers packaged IMUs can be utilized to detect and measure such changes. Inclinometers or similar sensors may be employed to monitor the orientation of the excavator chassis 28 or portions of the boom assembly 24 relative to gravity in embodiments. The vehicle motion data sources 74 may further include Global Navigation Satellite System (GNSS) modules, such as Global Positioning System (GPS) modules, for monitoring excavator position and motion states. In embodiments, the vehicle motion data sources 74 may also include sensors from which the rotational rate of the undercarriage tracks may be calculated, electronic compasses for monitoring heading, and other such sensors. In certain cases, GPS or other GNSS data may also be utilized, possibly along with map data stored in the memory 48, to determine when the excavator 20 (or other work vehicle) operates within an environment in which significant disturbance forces are likely to be encountered. Finally, the vehicle motion data sources 74 can include various sensors for monitoring the motion and position of the boom assembly 24 and the bucket 26, including MEMS devices integrated into the boom assembly 24 (as previously noted), transducers for measuring angular displacements at the pin joints of the boom assembly, transducers for measuring the stroke of the hydraulic cylinders 38, 40, 42, and the like.

Embodiments of the MRF joystick system 22 may further include any number of other non-joystick components 76 in addition to those previously described. Such additional non-joystick components 76 may include an operator interface 78 (distinct from the MRF joystick device 52), a display device 80 located in the excavator cabin 32, and various other types of non-joystick sensors 82. The operator interface 78, in particular, can include any number and type of non joystick input devices for receiving operator input, such as buttons, switches, knobs, and similar manual inputs external to the MRF joystick device 52. Such input devices included in the operator input interface 78 can also include cursor-type input devices, such as a trackball or joystick, for interacting with a graphical user interface (GUI) generated on the display device 80. The display device 80 may be located within the cabin 32 and may assume the form of any image-generating device on which visual alerts and other information may be visually presented. The display device 80 may also generate a GUI for receiving operator input or may include other inputs (e.g., buttons or switches) for receiving operator input, which may be pertinent to the controller architecture 50 when performing the below-described processes. In certain instances, the display device 80 may also have touch input capabilities.

Finally, the MRF joystick system 22 can include various other non-joystick sensors 82, which provide the controller architecture 50 with data inputs utilized in carrying-out the below-described processes. For example, the non-joystick sensors 82 can include sensors for automatically determining the type of implement currently attached to the excavator 20 (or other work vehicle) in at least some implementations when this information is considered by the controller architecture 50 in determining when to increase joystick stiffness to perform certain enhanced joystick functions described herein; e.g., such sensors 82 may determine a particular implement type currently attached to the excavator 20 by sensing a tag (e.g., a radio frequency identification tag) or reading other identifying information present on the implement, by visual analysis of a camera feed capturing the implement, or utilizing any other technique. In other instances, an operator may simply enter information selecting the implement type currently attached to the boom assembly 24 by, for example, interacting with a GUI generated on the display device 80. In still other instances, such other non-joystick sensors 82 may include sensors or cameras capable of determining when an operator grasps or other contacts the joystick 60. In other embodiments, such sensors may not be contained in the MRF joystick system 22.

As further schematically depicted in FIG. 1, the controller architecture 50 is associated with a memory 48 and may communicate with the various illustrated components over any number of wired data connections, wireless data connections, or any combination thereof; e.g., as generically illustrated, the controller architecture 50 may receive data from various components over a centralized vehicle or a controller area network (CAN) bus 84. The term "controller architecture," as appearing herein, is utilized in a non-limiting sense to generally refer to the processing subsystem of a work vehicle MRF joystick system, such as the example MRF joystick system 22. Accordingly, the controller architecture 50 can encompass or may be associated with any practical number of processors, individual controllers, computer-readable memories, power supplies, storage devices, interface cards, and other standardized components. In many instances, the controller architecture 50 may include a local controller directly associated with the joystick interface and other controllers located within the operator station enclosed by the cabin 32, with the local controller communicating with other controllers onboard the excavator 20 as needed. The controller architecture 50 may also include or cooperate with any number of firmware and software programs or computer-readable instructions designed to carry-out the various process tasks, calculations, and control functions described herein. Such computer-readable instructions may be stored within a non-volatile sector of the memory 48 associated with (accessible to) the controller architecture 50. While generically illustrated in FIG. 1 as a single block, the memory 48 can encompass any number and type of storage media suitable for storing computer-readable code or instructions, as well as other data utilized to support the operation of the MRF joystick system 22. The memory 48 may be integrated into the controller architecture 50 in embodiments as, for example, a system-in-package, a system-on-a-chip, or another type of microelectronic package or module.

Figure 2:
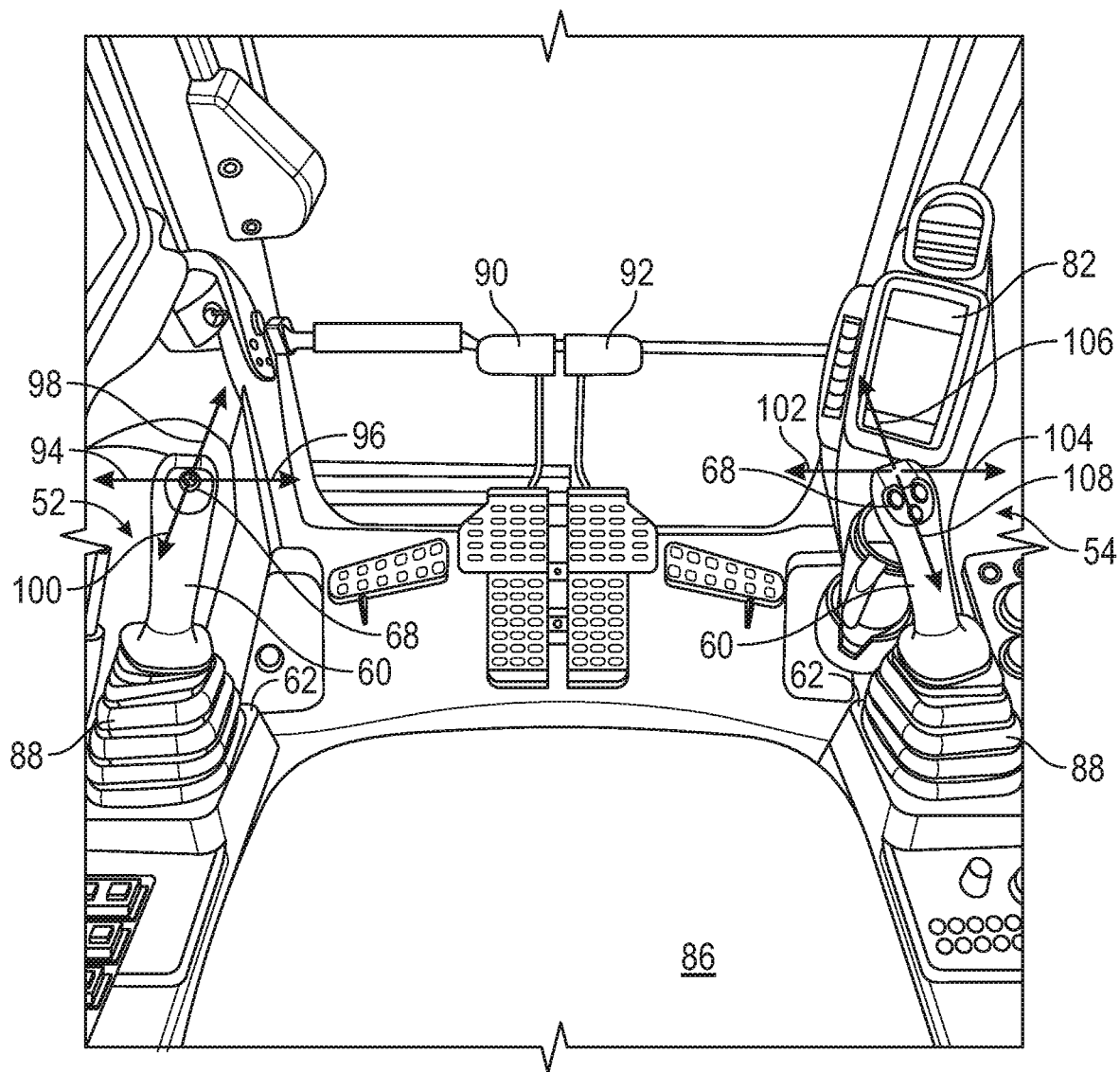
FIG. 2 is a perspective view from within the excavator cabin shown in FIG. 1 illustrating two joystick devices, which may be included in the example MRF joystick system and utilized by an operator to control movement of the excavator boom assembly.

Discussing the joystick configuration or layout of the excavator 20 in greater detail, the number of joystick devices included in the MRF joystick system 22, and the structural aspects and function of such joysticks, will vary amongst embodiments. As previously mentioned, although only a single joystick device 52 is schematically shown in FIG. 1, the MRF joystick system 22 will typically two joystick devices 52, 54 supporting excavator boom assembly control. Further illustrating this point, FIG. 2 provides a perspective view from within the excavator cabin 32 and depicting two MRF joystick devices 52, 54 suitably included in embodiments of the MRF joystick system 22. As can be seen, the MRF joystick devices 52, 54 are positioned on opposing sides of an operator seat 86 such that an operator, using both hands, can concurrently manipulate the left MRF joystick device 52 and the right joystick device 54 with relative ease. Carrying forward the reference numerals introduced above in connection with FIG. 1, each joystick device 52, 54 includes a joystick 60 mounted to a lower support structure or base housing 62 for rotation relative to the base housing 62 about two perpendicular axes. The joystick devices 52, 54 also each include a flexible cover or boot 88 joined between a lower portion of the joysticks 60 and their respective base housings 62. Additional joystick inputs are also provided on each joystick 60 in the form of thumb-accessible buttons and, perhaps, as other non-illustrated manual inputs (e.g., buttons, dials, and or switches) provided on the base housings 62. Other notable features of the excavator 20 shown in FIG. 2 include the previously-mentioned display device 80 and pedal/control lever mechanisms 90, 92 for controlling the respective movement of the right and left tracks of the tracked undercarriage 30.

Different control schemes can be utilized to translate movement of the joysticks 60 included in the joystick devices 52, 54 to corresponding movement of the excavator boom assembly 24. In many instances, the excavator 20 will support boom assembly control in either (and often allow switching between) a "backhoe control" or "SAE control" pattern and an "International Standard Organization" or "ISO" control pattern. In the case of the backhoe control pattern, movement of the left joystick 60 to the operator's left (arrow 94) swings the excavator boom assembly 24 in a leftward direction (corresponding to counter-clockwise rotation of the chassis 28 relative to the tracked undercarriage 30), movement of the left joystick 60 to the operator's right (arrow 96) swings the boom assembly 24 in a rightward direction (corresponding to clockwise rotation of the chassis 28 relative to the tracked undercarriage 30), movement of the left joystick 60 in a forward direction (arrow 98) lowers the hoist boom 34, and movement of the left joystick 60 in an aft or rearward direction (arrow 100) raises the hoist boom 34. Also, in the case of the backhoe control pattern, movement of the right joystick 60 to the left (arrow 102) curls the bucket 26 inwardly, movement of the right joystick 60 to the right (arrow 104) uncurls or "opens" the bucket 26, movement of the right joystick 60 in a forward direction (arrow 106) rotates the dipperstick 36 outwardly, and movement of the right joystick 60 in an aft or rearward direction (arrow 108) rotates the dipperstick 36 inwardly. Comparatively, in the case of an ISO control pattern, the joystick motions for the swing commands and the bucket curl commands are unchanged, while the joystick mappings of the hoist boom and dipperstick are reversed. Thus, in the ISO control pattern, forward and aft movement of the left joystick 60 controls the dipperstick rotation in the previously described manner, while forward and aft movement of the right joystick 60 controls motion (raising and lowering) of the hoist boom 34 in the manner described above.

Figure 3:
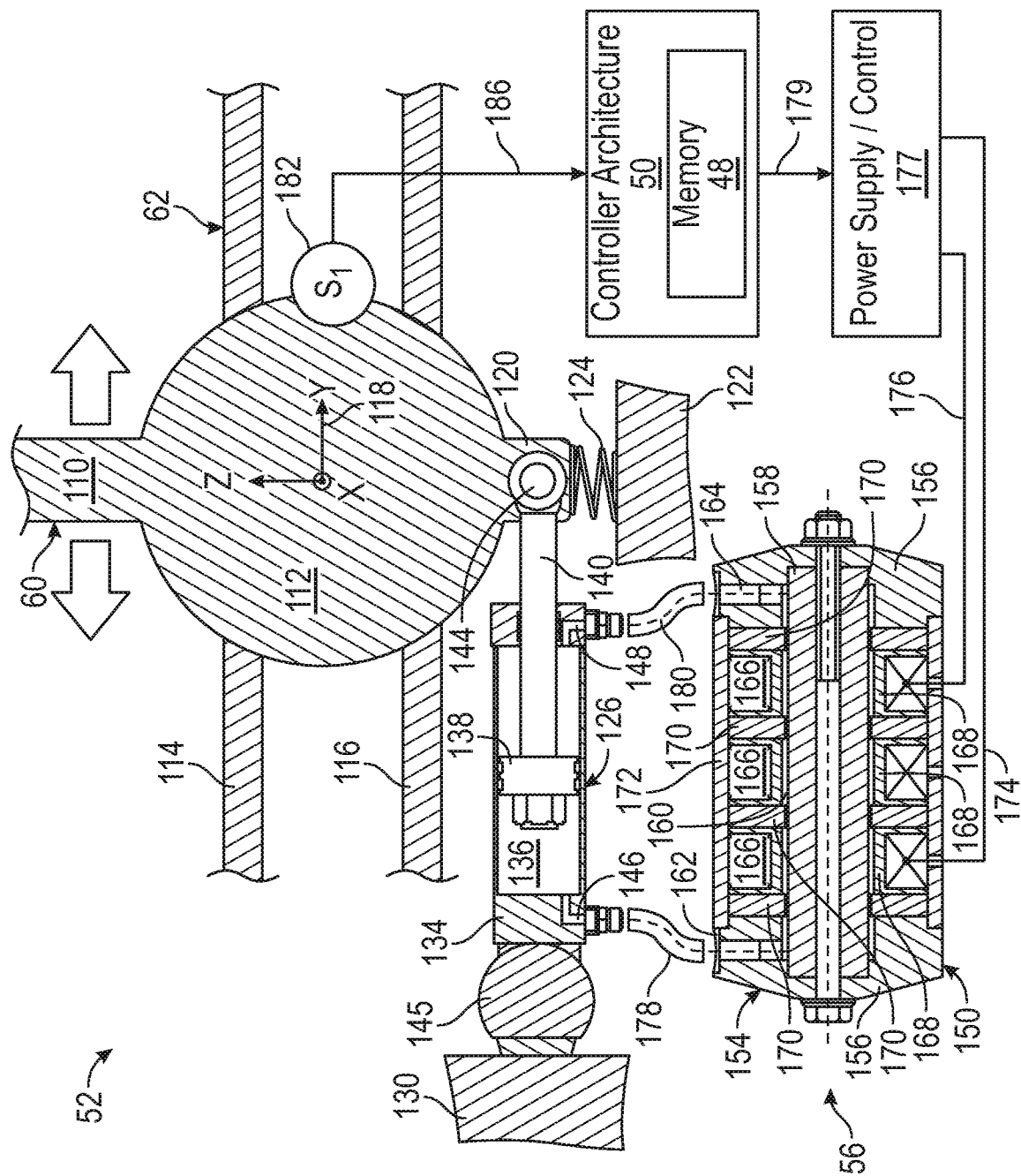
FIGS. 3 and 4 are cross-sectional schematics of the example MRF joystick system, as partially shown and taken along perpendicular section planes through a joystick included in a joystick device, illustrating one possible construction of the MRF joystick system.
Figure 4:
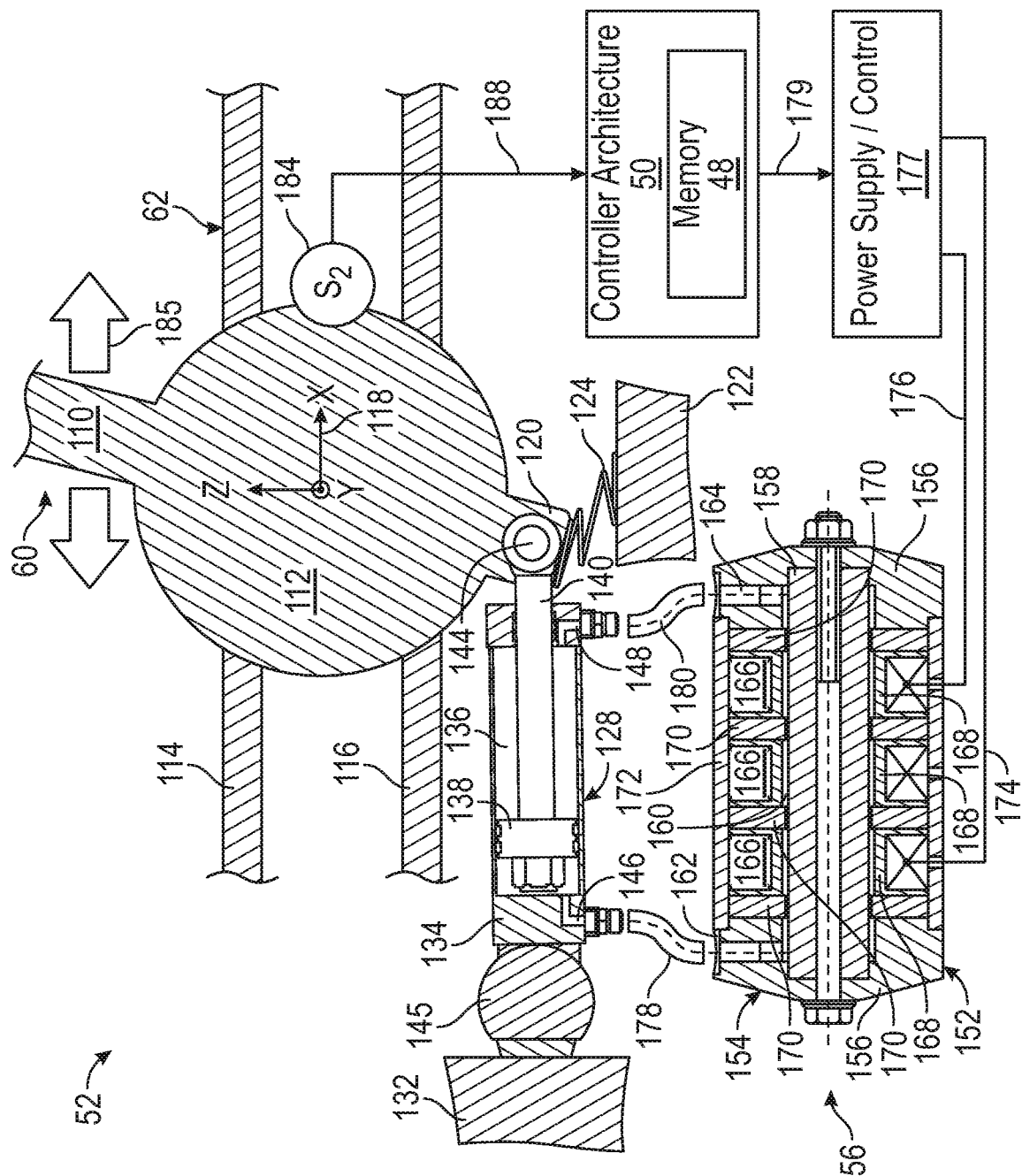

Turning now to FIGS. 3 and 4, an example construction of the MRF joystick device 52 and the MRF joystick resistance mechanism 56 is represented by two simplified cross-sectional schematics. While these drawing figures illustrate a single MRF joystick device (i.e., the MRF joystick device 52), the following description is equally applicable to the other MRF joystick device 54 included in the example MRF joystick system 22. The following description is provided by way of non-limiting example only, noting that numerous different joystick designs incorporating or functionally cooperating with MRF joystick resistance mechanisms are possible. The particular composition of the magnetorheological fluid largely is also inconsequential to embodiments of the present disclosure, providing that meaningful variations in the rheological properties (viscosity) of the magnetorheological fluid occur in conjunction with controlled variations in EM field strength, as described below. For completeness, however, is noted that one magnetorheological fluid composition well-suited for usage in embodiments of the present disclosure contains magnetically-permeable (e.g., carbonyl iron) particles dispersed in a carrier fluid, which is predominately composed of an oil or an alcohol (e.g., glycol) by weight.

Such magnetically-permeable particles may have an average diameter (or other maximum cross-sectional dimension if the particles possess a non-spherical (e.g., oblong) shape) in the micron range; e.g., in one embodiment, spherical magnetically-permeable particles are used having an average diameter between one and ten microns. Various other additives, such as dispersants or thinners, may also be included in the magnetorheological fluid to fine-tune the properties thereof.

Referring now to the example joystick construction shown in FIGS. 3 and 4, and again carrying forward the previously-introduced reference numerals as appropriate, the MRF joystick device 52 includes a joystick 60 having at least two distinct portions or structural regions: an upper handle 110 (only a simplified, lower portion of which is shown in the drawing figures) and a lower, generally spherical base portion 112 (hereafter, the "generally spherical base 112"). The generally spherical base 112 of the joystick 60 is captured between two walls 114, 116 of the base housing 62, which may extend substantially parallel to one another to form an upper portion of the base housing 62. Vertically-aligned central openings are provided through the housing walls 114, 116, with the respective diameters of the central openings dimensioned to be less than the diameter of the generally spherical base 112. The spacing or vertical offset between the walls 114, 116 is further selected such that the bulk of generally spherical base 112 is captured between the vertically-spaced housing walls 114, 116 to form a ball-and-socket type joint. This permits rotation of the joystick 60 relative to the base housing 62 about two perpendicular axes, which correspond to the X- and Y-axes of a coordinate legend 118 appearing in FIGS. 3 and 4; while generally preventing translational movement of the joystick 60 along the X-, Y-, and Z-axes of the coordinate legend 118. In further embodiments, various other mechanical arrangements can be employed to mount a joystick to a base housing, while allowing rotation of the joystick about two perpendicular axis, such as a gimbal arrangement. In less complex embodiments, a pivot or pin joint may be provided to permit rotation of the joystick 60 relative to the base housing 62 about a single axis.

The joystick 60 of the MRF joystick device 52 further includes a stinger or lower joystick extension 120, which projects from the generally spherical base 112 in a direction opposite the joystick handle 110. The lower joystick extension 120 is coupled to a static attachment point of the base housing 62 by a single return spring 124 in the illustrated schematic; here noting that such an arrangement is simplified for the purposes of illustration and more complex spring return arrangements (or other joystick biasing mechanisms, if present) will typically be employed in actual embodiments of the MRF joystick device 52. When the joystick 60 is displaced from the neutral or home position shown in FIG. 3, the return spring 124 deflects as shown in FIG. 4 to urge return of the joystick 60 to the home position (FIG. 3). Consequently, as an example, after rotation into the position shown in FIG. 4, the joystick 60 will return to the neutral or home position shown in FIG. 3 under the influence of the return spring 124 should the work vehicle operator subsequently release the joystick handle 110. In other embodiments, the MRF joystick device 52 may not be self-centering and may, instead, assume the form a friction-hold joystick remaining at a particular position absent an operator-applied force moving the joystick from the position.

The example MRF joystick resistance mechanism 56 includes a first and second MRF cylinders 126, 128 shown in FIGS. 3 and 4, respectively. The first MRF cylinder 126 (FIG. 3) is mechanically joined between the lower joystick extension 120 and a partially-shown, static attachment point or infrastructure feature 130 of the base housing 62. Similarly, the second MRF cylinder 128 (FIG. 4) is mechanically joined between the lower joystick extension 120 and a static attachment point 132 of the base housing 62, with the MRF cylinder 128 rotated relative to the MRF cylinder 126 by approximately 90 degrees about the Z-axis of the coordinate legend 118. Due to this structural configuration, the MRF cylinder 126 (FIG. 3) is controllable to selectively resist rotation of the joystick 60 about the X-axis of coordinate legend 118, while the MRF cylinder 128 (FIG. 4) is controllable to selectively resist rotation of the joystick 60 about the Y-axis of coordinate legend 118. Additionally, both MRF cylinders 126, 128 can be jointly controlled to selectively resist rotation of the joystick 60 about any axis falling between the X- and Y-axes and extending within the X-Y plane. In other embodiments, a different MRF cylinder configuration may be utilized and include a greater or lesser number of MRF cylinders; e.g., in implementations in which it is desirable to selectively resist rotation of joystick 60 about only the X-axis or only the Y-axis, or in implementations in which joystick 60 is only rotatable about a single axis, a single MRF cylinder or a pair of antagonistic cylinders may be employed. Finally, although not shown in the simplified schematics, any number of additional components can be included in or associated with the MRF cylinders 126, 128 in further implementations. Such additional components may include sensors for monitoring the stroke of the cylinders 126, 128 if desirably known to, for example, track joystick position in lieu of the below-described joystick sensors 182, 184.

The MRF cylinders 126, 128 each include a cylinder body 134 to which a piston 138, 140 is slidably mounted. Each cylinder body 134 contains a cylindrical cavity or bore 136 in which a head 138 of one of the pistons 138, 140 is mounted for translational movement along the longitudinal axis or centerline of the cylinder body 134. About its outer periphery, each piston head 138 is fitted with one or more dynamic seals (e.g., O-rings) to sealingly engaging the interior surfaces of the cylinder body 134, thereby separating the bore 136 into two antagonistic variable-volume hydraulic chambers. The pistons 138, 140 also each include an elongated piston rod 140, which projects from the piston head 138 toward the lower joystick extension 120 of the joystick 60. The piston rod 140 extends through an end cap 142 affixed over the open end of the cylinder body 134 (again, engaging any number of seals) for attachment to the lower joystick extension 120 at a joystick attachment point 144. In the illustrated example, the joystick attachment points 144 assume the form of pin or pivot joints; however, in other embodiments, more complex joints (e.g., spherical joints) may be employed to form this mechanical coupling. Opposite the joystick attachment points 144, the opposing end of the MRF cylinders 126, 128 are mounted to the respective static attachment points 130, 132 via spherical joints 145. Finally, hydraulic ports 146, 148 are further provided in opposing end portions of each MRF cylinder 126, 128 to allow the inflow and outflow of magnetorheological fluid in conjunction with translational movement or stroking of the pistons 138, 140 along the respective longitudinal axes of the MRF cylinders 126, 128.

The MRF cylinders 126, 128 are fluidly interconnected with corresponding MRF valves 150, 152, respectively, via flow line connections 178, 180. As is the case with the MRF cylinders 126, 128, the MRF valves 150, 152 are presented as identical in the illustrated example, but may vary in further implementations. Although referred to as "valves" by common terminology (considering, in particular, that the MRF valves 150, 152 function to control magnetorheological fluid flow), it will be observed that the MRF valves 150, 152 lack valve elements and other moving mechanical parts in the instant example. As a beneficial corollary, the MRF valves 150, 152 provide fail safe operation in that, in the unlikely event of MRF valve failure, magnetorheological fluid flow is still permitted through the MRF valves 150, 152 with relatively little resistance. Consequently, should either or both of the MRF valves 150, 152 fail for any reason, the ability of MRF joystick resistance mechanism 56 to apply resistance forces restricting or inhibiting joystick motion may be compromised; however, the joystick 60 will remain freely rotatable about the X- and Y-axes in a manner similar to a traditional, non-MRF joystick system, and the MRF joystick device 52 will remain capable of controlling the excavator boom assembly 24 as typical.

In the depicted embodiment, the MRF valves 150, 152 each include a valve housing 154, which contains end caps 156 affixed over opposing ends of an elongated cylinder core 158. A generally annular or tubular flow passage 160 extends around the cylinder core 158 and between two fluid ports 162, 164, which are provided through the opposing end caps 156. The annular flow passage 160 is surrounded by (extends through) a number of EM inductor coils 166 (hereafter, "EM coils 166"), which are wound around paramagnetic holders 168 and interspersed with a number of axially- or longitudinally-spaced ferrite rings 170. A tubular shroud 172 surrounds this assembly, while a number of leads are provided through the shroud 172 to facilitate electrical interconnection with the housed EM coils 166. Two such leads, and the corresponding electrical connections to a power supply and control source 177, are schematically represented in FIGS. 3 and 4 by lines 174, 176. As indicated by arrows 179, the controller architecture 50 is operably coupled to the power supply and control source 177 in a manner enabling the controller architecture 50 to control the source 177 to vary the current supplied to or the voltage applied across the EM coils 166 during operation of the MRF joystick system 22. This structural arrangement thus allows the controller architecture 50 to command or control the MRF joystick resistance mechanism 56 to vary the strength of an EM field generated by the EM coils 166. The annular flow passage 160 extends through the EM coils 166 (and may be substantially co-axial therewith) such that the magnetorheological fluid passes through the center the EM field when as the magnetorheological fluid is conducted through the MRF valves 150, 152.

The fluid ports 162, 164 of the MRF valves 150, 152 are fluidly connected to the ports 146, 148 of the corresponding the MRF cylinders 126, 128 by the above-mentioned conduits 178, 180, respectively. The conduits 178, 180 may be, for example, lengths of flexible tubing having sufficient slack to accommodate any movement of the MRF cylinders 126, 128 occurring in conjunction with rotation of the joystick 60. Consider, in this regard, the example scenario of FIG. 4. In this example, an operator has moved the joystick handle 110 in an operator input direction (indicated by arrow 185) such that the joystick 60 rotates about the Y-axis of coordinate legend 118 in a clockwise direction. In combination with this joystick motion, the MRF cylinder 128 rotates about the spherical joint 145 to tilt slightly upward as shown. Also, along with this operator-controlled joystick motion, the piston 138, 140 contained in the MRF cylinder 128 retracts such that the piston head 138 moves to the left in FIG. 4 (toward the attachment point 132). The translation movement of the piston 138, 140 forces magnetorheological fluid flow through the MRF valve 152 to accommodate the volumetric decrease of the chamber on the left of the piston head 138 and the corresponding volumetric increase of the chamber to the right of the piston head 138. Consequently, at any point during such an operator-controlled joystick rotation, the controller architecture 50 can vary the current supplied to or the voltage across the EM coils 166 to vary the force resisting magnetorheological fluid flow through the MRF valve 152 and thereby achieve a desired MRF resistance force resisting further stroking of the piston 138, 140.

Given the responsiveness of MRF joystick resistance mechanism 56, the controller architecture 50 can control the resistance mechanism 56 to only briefly apply such an MRF resistance force, to increase the strength of the MRF resistance force in a predefined manner (e.g., in a gradual or stepped manner) with increasing piston displacement, or to provide various other resistance effects (e.g., a tactile detent or pulsating effect), as discussed in detail below. The controller architecture 50 can likewise control the MRF joystick resistance mechanism 56 to selectively provided such resistance effects as the piston 138, 140 included in the MRF valve 150 strokes in conjunction with rotation of the joystick 60 about the X-axis of coordinate legend 118. Moreover, the MRF joystick resistance mechanism 56 may be capable of independently varying the EM field strength generated by the EM coils 166 within the MRF valves 150, 152 to allow independent control of the MRF resistance forces inhibiting joystick rotation about the X- and Y-axes of coordinate legend 118.

The MRF joystick device 52 may further contain one or more joystick position sensors 182, 184 (e.g., optical or non-optical sensors or transformers) for monitoring the position or movement of the joystick 60 relative to the base housing 62. In the illustrated example, specifically, the MRF joystick device 52 includes a first joystick position sensor 182 (FIG. 3) for monitoring rotation of the joystick 60 about the X-axis of coordinate legend 118, and a second joystick position sensor 184 (FIG. 4) for monitoring rotation of the joystick 60 about the Y-axis of coordinate legend 118. The data connections between the joystick position sensors 182, 184 and the controller architecture 50 are represented by lines 186, 188, respectively. In further implementations, the MRF joystick device 52 can include various other non-illustrated components, as can the MRF joystick resistance mechanism 56. Such components can include operator inputs and corresponding electrical connections provided on the joystick 60 or the base housing 62, AFF motors, and pressure and/or flow rate sensors included in the flow circuit of the MRF joystick resistance mechanism 56, as appropriate, to best suit a particular application or usage.

As previously emphasized, the above-described embodiment of the MRF joystick device 52 is provided by way of non-limiting example only. In alternative implementations, the construction of the joystick 60 can differ in various respects. So too may the MRF joystick resistance mechanism 56 differ in further embodiments relative to the example shown in FIGS. 3 and 4, providing that the MRF joystick resistance mechanism 56 is controllable by the controller architecture 50 to selectively apply a resistance force (through changes in the rheology of a magnetorheological fluid) inhibiting movement of a joystick relative to a base housing in at least one DOF. In further realizations, EM inductor coils similar or identical to the EM coils 166 may be directly integrated into the MRF cylinders 126, 128 to provide the desired controllable MRF resistance effect. In such realizations, magnetorheological fluid flow between the variable volume chambers within a given MRF cylinder 126, 128 may be permitted via the provision of one or more orifices through the piston head 138, by providing an annulus or slight annular gap around the piston head 138 and the interior surfaces of the cylinder body 134, or by providing flow passages through the cylinder body 134 or sleeve itself. Advantageously, such a configuration may impart the MRF joystick resistance mechanism with a relatively compact, integrated design. Comparatively, the usage of one or more external MRF valves, such as the MRF valves 150, 152 (FIGS. 3 and 4), may facilitate cost-effective manufacture and allow the usage of commercially-available modular components in at least some instances.

In still other implementations, the design of the MRF joystick device may permit the magnetorheological fluid to envelop and act directly upon a lower portion of the joystick 60 itself, such as the spherical base 112 in the case of the joystick 60, with EM coils positioned around the lower portion of the joystick and surrounding the magnetological fluid body. In such embodiments, the spherical base 112 may be provided with ribs, grooves, or similar topological features to promote displacement of the magnetorheological fluid in conjunction with joystick rotation, with energization of the EM coils increasing the viscosity of the magnetorheological fluid to impede fluid flow through restricted flow passages provided about the spherical base 112 or, perhaps, due to sheering of the magnetorheological fluid in conjunction with joystick rotation. Various other designs are also possible in further embodiments of the MRF joystick system 22.

Regardless of the particular design of the MRF joystick resistance mechanism 56, the usage of MRF technology to selectively generate a variable MRF resistance force or joystick stiffness inhibiting (resisting or preventing) targeted joystick motions provides several advantages. As a primary advantage, the MRF joystick resistance mechanism 56 (and MRF joystick resistance mechanism generally) are highly responsive and can effectuate desired changes in EM field strength, in the rheology of the magnetorheological fluid, and ultimately in the MRF-applied joystick stiffness inhibiting joystick motions in highly abbreviated time periods; e.g., time periods on the order of 1 millisecond in certain instances. Correspondingly, the MRF joystick resistance mechanism 56 may enable the MRF resistance force to be removed (or at least greatly reduced) with an equal rapidity by quickly reducing current flow through the EM coils and allowing the rheology of the magnetorheological fluid (e.g., fluid viscosity) to revert to its normal, unstimulated state. The controller architecture 50 can further control the MRF joystick resistance mechanism 56 to generate the MRF resistance force to have a continuous range of strengths or intensities, within limits, through corresponding changes in the strength of the EM field generated utilizing the EM coils 166. Beneficially, the MRF joystick resistance mechanism 56 can provide reliable, essentially noiseless operation over extended time periods. Additionally, the magnetorheological fluid can be formulated to be non-toxic in nature, such as when the magnetorheological fluid contains carbonyl iron-based particles dispersed in an alcohol-based or oil-based carrier fluid, as previously described. Finally, as a still further advantage, the above-described configuration of the MRF joystick resistance mechanism 56 allows the MRF joystick system 22 to selectively generate a first resistance force or joystick stiffness deterring joystick rotation about a first axis (e.g., the X-axis of coordinate legend 118 in FIGS. 3 and 4), while further selectively generating a second resistance force or joystick stiffness deterring joystick rotation about a second axis (e.g., the Y-axis of coordinate legend 118) independently of the first resistance force (joystick stiffness); that is, such that the first and second resistance forces have different magnitudes, as desired.

Figure 5:
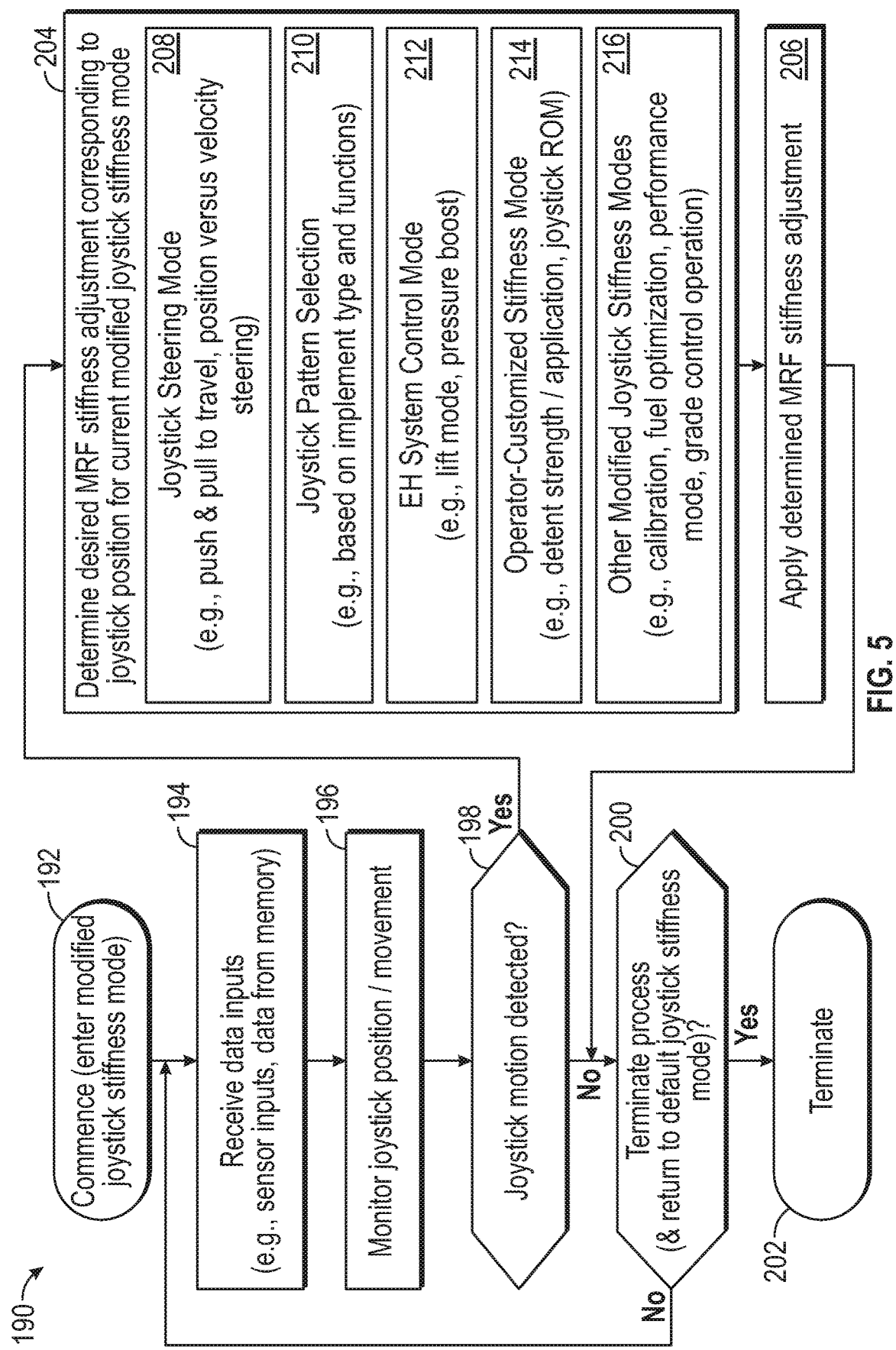
FIG. 5 is a process suitably carried-out by a controller architecture of the work vehicle MRF joystick system to selectively place the MRF joystick system in at least one modified joystick stiffness mode.

Referring now to FIG. 5, there is shown an example process 190 suitably carried-out by the controller architecture 50 to selectively place the MRF joystick system 22 in one or more modified joystick stiffness modes. The process 190 (hereafter, the "joystick stiffness modification process 190") includes a number of process STEPS 192, 194, 196, 198, 200, 202, 204, 206, each of which is described, in turn, below. Additionally, as indicated during STEP 204, any number of different modified joystick stiffness modes 208, 210, 212, 214, 216, may be applied by the controller architecture 50 in accordance with preestablished joystick stiffness control schemes or algorithms stored in the memory 48 of the MRF joystick system 22. Depending upon the particular manner in which the joystick stiffness modification process 190 is implemented, each step generically illustrated in FIG. 5 may entail a single process or multiple sub-processes. Further, the steps illustrated in FIG. 5 and described below are provided by way of non-limiting example only. In alternative embodiments of the joystick stiffness modification process 190, additional process steps may be performed, certain steps may be omitted, and/or the illustrated process steps may be performed in alternative sequences.

The joystick stiffness modification process 190 commences at STEP 192 in response to the occurrence of a predetermined trigger event. Initiation of the joystick stiffness modification process 190 places the work vehicle MRF joystick system 22 in a selected modified joystick stiffness mode, such as any of the example joystick stiffness modes 208, 210, 212, 214, 216 appearing on the right of FIG. 5. The trigger event can be any event, condition, or occurrence desirably inducing transition of the MRF joystick system 22 from operation in its current joystick stiffness mode (e.g., a default or non-modified joystick stiffness mode) to operation in a particular modified joystick stiffness mode. In this regard, the joystick stiffness modification process 190 may initiate at STEP 192 in response to work vehicle startup, such as startup of the example excavator 20 shown in FIGS. 1 and 2. Alternatively, the trigger event may be entry of operator input requesting activation or execution of the joystick stiffness modification process 190; e.g., in one embodiment, an operator may interact with a GUI generated on the display device 80 to initiate the joystick stiffness modification process 190 and thereby place the MRF joystick system 22 in a selected joystick stiffness modification mode. In still other instances, the controller architecture 50 may commence the joystick stiffness modification process 190 automatically (that is, without requiring operator input) when determining that the work vehicle is engaged in a particular type of work task, when the work vehicle or a system onboard the work vehicle (e.g., the EH actuation system 44 of the excavator 20) is placed in a particular mode of operation, or when a particular type of work implement is attached to the work vehicle.

Following commencement of the joystick stiffness modification process 190, the controller architecture 50 progresses to STEP 194 and gathers pertinent non-joystick data inputs, which are utilized in performing the remainder of the process 190. Such data inputs will vary in relation to the nature or implementation specifics of the newly-activated modified joystick stiffness mode, as further discussed below in connection with the example joystick stiffness modes 208, 210, 212, 214, 216 shown in the right of FIG. 5. Generally, the data inputs collected during STEP 194 may include information received from sensors onboard the work vehicle, when such sensor input is utilized in determining appropriate MRF-applied adjustments to joystick stiffness. For example, in the case of the below-described speed optimization mode, sensor data utilized to calculate an optimal speed of the work vehicle (e.g., to maximize fuel efficiency) may be gathered during STEP 194. So too may any pertinent data be recalled from an onboard memory (e.g., the memory 48 of the excavator 20) during STEP 194 in some embodiments. In this regard, and as further example, data may be recalled from memory 48 defining the overarching parameters of the modified joystick stiffness mode and forming part of the joystick stiffness modification algorithm or control scheme. Any operator customization profiles, which specify operator customization settings pertaining to MRF-influenced joystick behaviors (e.g., overall joystick stiffness, the presence or intensity of MRF detents, any modifications to joystick ROM, and so on), may also be recalled from the memory 48 during STEP 194 and subsequently utilized in determining the MRF joystick stiffness adjustments during STEP 204 of the process 190, as further described below.

Advancing next to STEP 196 of the joystick stiffness modification process 190, the controller architecture 50 receives data indicative of the current joystick movement and position of the MRF joystick device (or devices) under consideration. In the case of the example excavator 20, the controller architecture 50 receives data from the joystick position sensors 182, 184, which describes the movement of the respective joysticks 60 included in the devices 52, 54. At STEP 198, the controller architecture 50 utilizes then this data to determine whether an operationally-significant movement of one or more joystick has occurred during the current iteration of the joystick stiffness modification process 190. If operationally-significant joystick movement is detected, the controller architecture 50 progresses to STEP 204 of the joystick stiffness modification process 190, as discussed in detail below. Otherwise, the controller architecture 50 advances to STEP 200 and determines whether the current iteration of the joystick stiffness modification process 190 should terminate; e.g., due to work vehicle shutdown, due to continued inactivity of the joystick-controlled function for a predetermined time period, or due to removal of the condition or trigger event in response to which the process 190 was initially commenced at STEP 192. If determining that the joystick stiffness modification process 190 should terminate at STEP 200, the controller architecture 50 progresses to STEP 202, the process 190 terminates accordingly. Termination of the process 190 may return to the MRF joystick system 22 to its default mode of operation. If instead determining that the joystick stiffness modification process 190 should continue, the controller architecture 50 returns to STEP 194 and the above-described process steps repeat or loop.

In response to the detection of operationally-significant joystick rotation (or other joystick movement) at STEP 202, the controller architecture 50 advances to STEP 204 of the joystick stiffness modification process 190. During STEP 204 of the process 190, the controller architecture 50 determines the appropriate manner in which to vary the MRF resistance force (and therefore the joystick stiffness) inhibiting movement of a given joystick based, at least in part, on the current joystick position and the particular modified joystick stiffness in which the work vehicle MRF joystick system 22 now operates. Several examples of manners in which controller architecture 50 may command the MRF joystick resistance mechanism 56 to modify joystick behaviors when the MRF joystick system 22 is placed in a particular modified joystick stiffness mode are discussed in detail below. After determining the appropriate MRF stiffness adjustment during STEP 204, the controller architecture 50 then advances to STEP 206 and applies the newly-determined MRF resistance force or joystick stiffness by transmitting appropriate commands to the MRF joystick resistance mechanism 56 to vary the rheology (viscosity) of the MRF fluid body (or bodies) in a manner achieving the desired MRF-applied resistance effect. Following this, the controller architecture 50 then progresses to STEP 200 and determines whether the current iteration of the joystick stiffness modification process 190 should terminate or whether additional iterations of process 190 should be conducted, as previously described. In this manner, the controller architecture 50 may repeatedly perform successive iterations of the process 190, as appropriate, to selectively transition the MRF joystick system 22 between operation a default joystick stiffness mode and one or more modified joystick stiffness modes.

As noted above, several example of modified joystick stiffness modes 208, 210, 212, 214, 216 are shown in FIG. 5. The illustrated modified joystick stiffness modes 208, 210, 212, 214, 216 are provided by way of non-limiting example and are each discussed, in turn, below. Initially addressing the joystick steering mode 208, the controller architecture 50 may implement different joystick stiffness modification modes in conjunction with usage of the MRF joystick devices 52 to control the steering and/or propulsion of a work vehicle in various contexts. In certain embodiments in which the work vehicle is operable in different steering modes, the controller architecture 50 may transition the MRF joystick system 22 between default and modified joystick stiffness modes in conjunction with user selection of different steering modes of the work vehicle 20. For example, embodiments of the work vehicle may be operable in either a position-based joystick steering scheme (or mode) or a velocity-based steering scheme (also referred to as "rate-based steering"). When velocity-based joystick steering is activated, joystick movement may control the speed at which the work vehicle wheels rotate about a steering axis. Comparatively, when position-based joystick steering is activated, the positioning of the joystick may be utilized to set a desired centering angle of the work vehicle wheels.

Continuing the description above in which a work vehicle operator can toggle between velocity-based and position-based joystick steering modes or schemes, the controller architecture 50 may operate in a first (e.g., a default or non-modified) joystick stiffness mode when the velocity-based joystick steering scheme is applied. When functioning in the first (e.g., default) joystick stiffness mode, the controller architecture 50 may command the MRF joystick resistance mechanism 56 to apply a lesser (little to no) MRF resistance force when the work vehicle to permit the self-centering joystick to return to its center position under the influence of the joystick bias mechanisms within the joystick device, such the spring 124 shown in FIGS. 3 and 4. The joystick may thus be permitted to self-center when the MRF joystick system 22 operates in the first (e.g., default) joystick stiffness mode, as appropriate when a velocity-based joystick steering scheme is utilized to control rotation of the work vehicle wheels about the steering axis. Conversely, the controller architecture 50 transitions the MRF joystick system 22 to operation in a second (e.g., a modified) joystick stiffness mode when the position-based joystick steering scheme is applied. In this case, the controller architecture 50 commands the MRF joystick resistance mechanism 56 to apply an increased MRF resistance force when appropriate to prevent return of the joystick to its center position solely under the influence of the joystick's inherent bias or centering force. The joystick will thus remain in an operator-commanded position when an operator releases or otherwise ceases exerting force on the joystick in a manner similar to non-self-centering (friction hold) joysticks, as appropriate when the position-based joystick steering mode is activated. In this manner, an operator is permitted to active switch between velocity-based and position-based joystick steering schemes without requiring alterations to hardware and while maintaining a common joystick axis for performing joystick steering between the different control schemes.

In additional embodiments, variuos other modified joystick stiffness modes may be employed when work vehicle steering and/or propulsion is controlled utilizing one or more MRF joystick devices. As a further example, in the case of work vehicles capable of operating in a creep mode, such as a dozer, trenching, or cold planning mode, the controller architecture 50 may place the work vehicle MRF joystick system 22 in a modified joystick stiffness mode in conjunction with placement of the work vehicle in a particular creep mode. In one possible approach, the controller architecture 50 may transition the MRF joystick system 22 to operate in a modified joystick stiffness mode when a work vehicle is placed in a creep, while enabling push-pull joystick operation for work vehicle travel. In particular, when operating in the modified joystick stiffness mode, the controller architecture 50 may command the MRF joystick resistance mechanism 56 to selectively generate (based upon joystick position) one or more MRF detents assisting the operator in piloting the work vehicle when in creep mode; e.g., one or more MRF hold detent may be generated to maintain the joystick in an operator-commanded position as the work vehicle creeps in a either a forward or rearward direction. In still further instances, other types of modified joystick stiffness modes may be employed when work vehicle steering and/or propulsion is controlled utilizing one or more MRF joystick devices. For example, in certain implementations, the controller architecture 50 may be configured to establish a target speed for the work vehicle based upon at least one performance parameter, such as fuel efficiency, when the work vehicle MRF joystick system 22 operates in the modified joystick stiffness mode. The controller architecture 50 may then command the MRF joystick resistance mechanism 56 to vary the MRF joystick stiffness to provide tactile feedback through the joystick device indicating when the current speed of the work vehicle matches the target speed of the work vehicle to assist an operator in better managing the work vehicle speed to achieve the desired performance parameter, such as to minimize fuel consumption and emissions.

Addressing next modified joystick stiffness modes alerting the ROM of the joystick (mode 210, FIG. 5), the controller architecture 50 may command the MRF joystick resistance mechanism 56 to limit, expand, or otherwise vary the ROM of a joystick when the work vehicle MRF joystick system is placed in a modified joystick stiffness mode. For example, in embodiments, the controller architecture 50 may restrict the ROM of a given MRF joystick device based on type of work implement attached to work vehicle. For example, embodiments of the MRF joystick system 22 may transition to operation in a modified joystick stiffness mode in which the ROM of a joystick is varied (relative to a default joystick stiffness mode) in response to the attachment of a particular type of interchangeable tool or implement to the work vehicle. In such embodiments, the sensors onboard the work vehicle may automatically determine the type of implement currently attached to the work vehicle; e.g., certain ones of the sensors 82 in the case of excavator 20. For example, such sensors may identify a particular implement type currently attached to the work vehicle by sensing a tag (e.g., a radio frequency identification tag) or reading other identifying information present on the implement, by visual analysis of a camera feed capturing the implement, or utilizing any other technique. In other instances, an operator may enter information specifying the implement type currently attached to the work vehicle boom assembly by, for example, interacting with a GUI generated on a display device located in an operator station of the work vehicle.

When appropriate, the controller architecture 50 then places the MRF joystick system 22 in the modified joystick stiffness mode adapted for best controlling the currently-attached work implement or tool. For example, in approach, MRF joystick rotation may be restricted to a single axis in the case of implements movable in a single DOF or otherwise capable of performing a single function, such as in the case of simple buckets. Conversely, for implements capable of multi-DOF movements or otherwise capable of performing multiple functions, the MRF joystick system may enable rotation of the joystick about two substantially perpendicular axes or tracks, with joystick motion along each track controlling or "mapped to" a different function of the currently-attached work implement. Examples of implements having multiple functions include multi-purpose buckets (4-in-1 buckets having movable panels or grapples), certain agricultural implements (e.g., windrower headers), and other implements having additional hydraulically-controlled functions. The controller architecture 50 may determine when to place the MRF joystick system 22 in a modified joystick stiffness mode in response to attachment or usage of a particular implement type by identifying the implement type and then determining, utilizing a multi-dimensional lookup table or similar data structure stored in the memory 48, the particular joystick stiffness mode corresponding to the newly-attached implement.

In embodiments, the controller architecture 50 may also selectively restrict the ROM of the MRF joystick to, for example, prevent cross-talk between different control axes. For example, in certain cases, the controller architecture may command the MRF joystick resistance mechanism 56 restrict joystick movement to the predetermined track pattern when the MRF joystick system 22 is placed in the first mode, while permitting joystick movement outside of the predetermined track pattern when the MRF joystick system 22 is placed in the second mode. To provide a useful, albeit non-limiting example, when the work vehicle is equipped with a forward, boom-mounted work implement or tool (e.g., a front end loader (FEL) bucket), the controller architecture 50 may place the work vehicle MRF joystick system 22 in a modified joystick stiffness mode in which the joystick movement is confined to a fixed-track pattern when the MRF joystick is utilized to functional aspects of the work vehicle transmission; and place the MRF joystick system 22 in the default joystick stiffness mode in which the joystick movement is permitted over a full ROM when the joystick is utilized to control movement of the FEL bucket. This is further illustrated in FIG. 6, which is a schematic 217 including a circular graphic 218 representing the full ROM of an example joystick (e.g., corresponding to either of the joysticks 60 shown in FIG. 2) when rotatable relative to a base housing about two orthogonal axes (noting also key 220).

Figure 6:
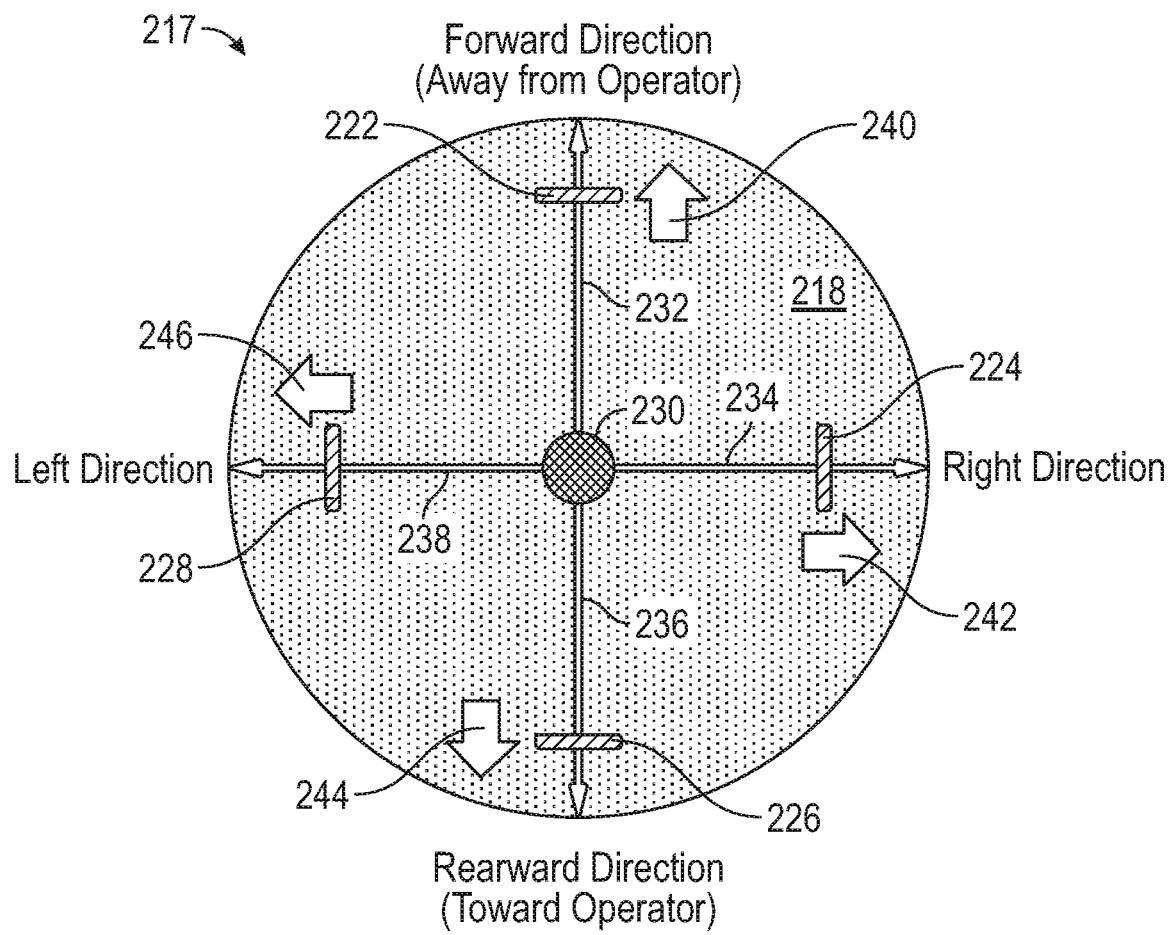
FIG. 6 is a schematic illustrating an example a joystick range of motion and possible locations of MRF detents, which may be selectively generated or modified when the MRF joystick system operates in a modified joystick stiffness mode in example embodiments of the modified joystick stiffness mode.

Continuing the example above, when the MRF joystick system 22 is placed in a modified joystick stiffness mode, the controller architecture 50 may control the MRF joystick resistance mechanism 56 to selectively increase the joystick stiffness to confine joystick movement to a restricted ROM pattern including or consisting of at least a first linear track (or straight pathway) extending from or through a center position 230 of the joystick. For example, in certain implementations, as indicated in FIG. 6, joystick travel may be limited to a first linear track 232, 236 and a second linear track 234, 238, which extend substantially perpendicular to one another and which intersect at the center position 230 of the joystick. Notably, given the versatility of the MRF joystick technology described herein, the controller architecture 50 can limit joystick movement to essentially any desired movement pattern, including patterns in which joystick movement is restricted to pathways having more complex (e.g., curved) geometries, as optimized to best suit a particular joystick-controlled application or function when the MRF joystick system 22 is placed in a particular stiffness mode.

As previously indicated, the controller architecture 50 may command the MRF joystick resistance mechanism 22 to generate localized regions of increased MRF resistance or "MRF detents" encountered as a joystick is moved into or through a particular position in variuos different joystick stiffness modes. In this regard, when the work vehicle MRF joystick system 22 is placed in a particular joystick stiffness mode, the controller architecture 50 may command the MRF joystick resistance mechanism 56 to generate such MRF detents (whether hold detents, feel detents, or a combination thereof) at any number of predetermined joystick positions to provide tactile cues to the operator, to enable the operator to temporarily set the joystick in a particular position (in the case of hold detents), to enable the operator to selectively-execute certain detent triggered functions, or for other reasons. Further, in at least some embodiments, the MRF joystick system 22 may permit an operator to assign different work vehicle functions to the detent positions or otherwise vary aspects of the MRF detent; e.g., detent hold force, detent location, detent position, or detent activation. Examples of joystick positions at which such MRF detents 222, 224, 226, 228 may be generated are shown in FIG. 6. The MRF detent positions 222, 224, 226, 228 are illustrated by way of example, noting that only single detent position, a subset of the detent positions, or detent positions having different locations over the joystick ROM can be generated in various embodiments of the MRF joystick system 22. Further, in certain instances, the joystick may be rotated into or through a particular detent position 222, 224, 226, 228, as indicated by arrows 240, 242, 244, 246, respectively, to active or trigger a particular work vehicle function, such as a kick-out function that (when executed) causes a bucket or other implement to be raised or lowered into a preset position; e.g., a default position or another position previously specified by the work vehicle operator.

Referring next to EH system control mode 212 shown in FIG. 5, in embodiments in which the work vehicle is equipped with an EH actuation system (e.g., EH actuation system 44 shown in FIG. 1) including cylinders controlling movement of a boom assembly, such as the cylinders 38, 40, 42 included in the boom assembly 24 of example excavator 20, the controller architecture 50 may place the MRF joystick system 22 in a modified joystick stiffness mode when the EH actuation system 44 is temporarily placed in a specialized or non-default hydraulic control mode. Examples of such hydraulic control modes include: (i) a lift mode in which a pressure limit of the EH actuation system is boosted, while a maximum pump flow of the EH actuation system is decreased; and (ii) a pressure boost mode in which a circuit pressure within the EH actuation system is temporarily increased. When operating in the lift mode, the controller architecture 50 may transition the MRF joystick system 22 into operation in a corresponding modified joystick stiffness mode in which joystick stiffness is increased or decreased, as appropriate, to provide an operator with tactile feedback regarding the controllability of the machine and, perhaps, indicative of pressure variations within the hydraulic system. Similarly, when operating in the pressure boost mode, the controller architecture 50 may place the MRF joystick into a modified joystick stiffness mode in which the joystick stiffness is decreased to provide an operator with an intuitive tactile cue that additional hydraulic power is now available to perform the current task utilizing the work vehicle's boom assembly. In still other embodiments, the controller architecture 50 may selectively place the MRF joystick system 22 in the modified joystick mode in conjunction with placement of the EH actuation system in another specialized control mode, such as a non-default hydraulic flow priority mode.

Advancing next to the operator-customized joystick stiffness mode 214 further shown within STEP 204 of the process 190 (FIG. 5), an operator may be permitted to adjust various aspects of joystick behavior to preference utilizing the MRF joystick system 22 in embodiments. Such aspects may include the stiffness and range of travel of a given joystick device included in the MRF joystick system 22, such as either of the joysticks 52, 54 of the example excavator 20 described above in connection with FIGS. 1-4. Similarly, an operator may be permitted to adjust the location, force, and/or positional span of any MRF detents generated in a particular modified joystick stiffness mode in embodiments; and, in at least some instances, selectively turn detents on and off. In this latter regard, and as briefly indicated above, the MRF joystick system 22 may also enable operators to program MRF detents in certain implementations; that is, assign different work vehicle functions to the MRF detents, with the work vehicle functions then triggered as an operator moves the corresponding joystick into or through a given MRF detent during ensuing work vehicle operation.

Operator personalization settings can be stored in a memory (e.g., the memory 48) accessible to the controller architecture 50, then recalled and applied when MRF joystick system 22 is placed in a particular joystick stiffness mode; here, an operator-customized stiffness mode. To this end, embodiments of the controller architecture 50 may first identify a particular operator (e.g., via operator-specific data, such as a unique pin, entered into the work vehicle operating, via a wireless fob or key carried by the operator having a unique identification number, by analysis of a camera feed capturing an operator's face, or in another manner) and then apply the corresponding MRF-related personalization settings corresponding to the identified operator when placing the work vehicle MRF joystick system 22 in an operator-customized or personalized stiffness mode. Accordingly, in at least some implementations, the controller architecture 50 may (i) place the work vehicle MRF joystick system 22 in the operator-customized stiffness mode in response to identification of an operator of the work vehicle associated with the operator customization profile; and (ii) when the work vehicle MRF joystick system 22 is placed in the operator-customized stiffness mode, command the MRF joystick resistance mechanism 56 to vary the joystick stiffness in accordance with the operator customization profile to, for example, impart the joystick device with a particular stiffness, ROM, or detent configuration previously adjusted to operator preference.

In additional implementations of the joystick stiffness modification process 190 (FIG. 5), the controller architecture 50 may place the work vehicle MRF joystick system 22 in variuos other modified joystick stiffness modes 216. For example, in certain embodiments in which a work vehicle is operable in multiple performance modes, the controller architecture 50 may selectively place the work vehicle MRF joystick system 22 in the modified joystick stiffness mode based, at least in part, on operator input data placing the work vehicle 20 in a selected one of the multiple performance modes. As a specific example, in the case of a compact loader, a skid steer loader (e.g., the example skid steering loader 250 described below in connection with FIG. 7), or another loader operable in two or more performance modes (e.g., precision, utility, or production modes), the controller architecture 50 may control the MRF joystick resistance mechanism 56 to implement a corresponding joystick stiffness mode, such as an increased-stiffness joystick stiffness mode when the loader is placed in a precision performance mode. In a somewhat similar regard, embodiments of the controller architecture 50 may selectively place the MRF joystick system 22 in a modified joystick stiffness mode when a motor grader, a dozer, or a similar work vehicle operates is utilized to carry-out a grading task. Specifically, in embodiments in which a work vehicle includes a grade control system and a blade positioned utilizing the joystick device, the controller architecture 50 may place the work vehicle MRF joystick system 22 in a modified joystick stiffness mode when an operator controls the blade during a grading task carried-out utilizing the grade control system. Further, in certain cases, the controller architecture 50 commands the MRF joystick resistance mechanism to vary one or more of the following joystick stiffness characteristics relative to operation in a default joystick stiffness mode: (i) changing the ROM of the joystick, (ii) suppressing the generation of one or more MRF detents, and/or (iii) removing a float function of the blade. Such modified joystick stiffness modes may be beneficially implemented in conjunction with motor graders, such as the example motor grader 252 described below in connection with FIG. 7.

Various other modified joystick stiffness modes can be applied by the MRF joystick system 22 in response to entry of a work vehicle into a particular mode of operation, usage of an MRF joystick device to control a particular work vehicle function, or in response to various other specified conditions. To provide yet another example, the controller architecture 50 may selectively place the MRF joystick system 22 in a modified joystick stiffness mode in conjunction with performance of a work vehicle calibration process, such a calibration process utilized to establish EH settings in the case of an excavator (e.g., the excavator 20) or another work vehicle equipped with a hydraulic-controlled boom assembly. In this case, as an example, the controller architecture 50 may command the MRF joystick resistance mechanism 56 to generate at least one MRF detent at a calibration position providing a tactile cue for an operator to maintain the joystick in the calibration position until completion of the calibration process. Stated differently, MRF detents may be temporarily generated to encourage an operator to hold a joystick command as the desired positions until completion of the calibration process, after which the controller architecture 50 may return the MRF joystick system 22 to operation in the default joystick stiffness mode. In this manner, the likelihood of calibration errors may be reduced when commanding a function until it reaches a pressure threshold and holding that command for a period of time. Such a function can dynamically create an MRF detent to prevent the operator from dropping the command below the threshold before the calibration is complete.

Figure 7:
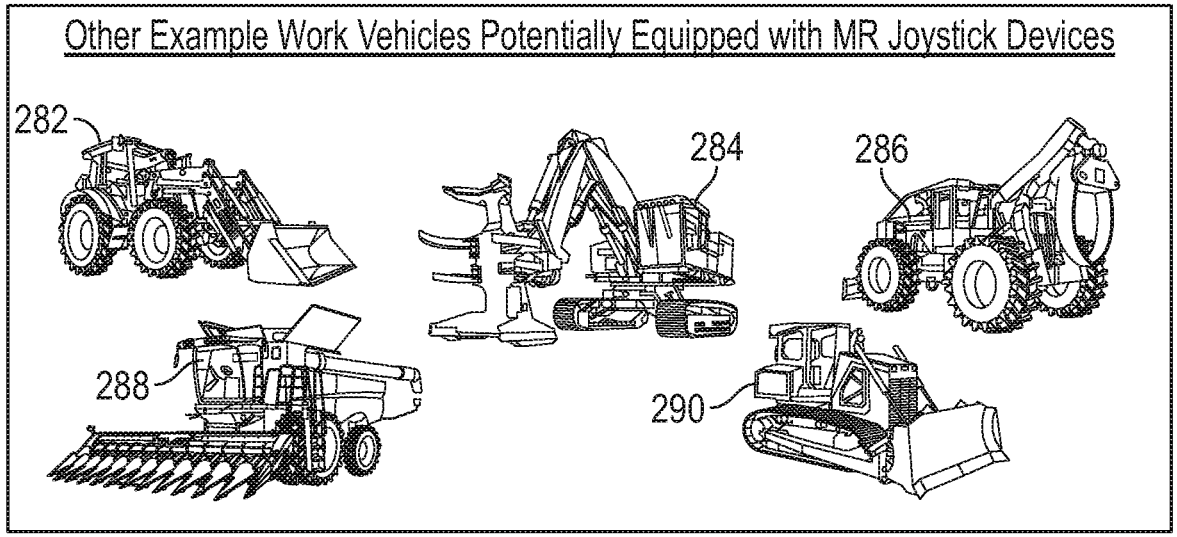
FIG. 7 is a graphic illustrating, in a non-exhaustive manner, additional example work vehicles into which embodiments of the MRF joystick system may be beneficially integrated.

Additional Examples of Work Vehicles Beneficially Equipped with MRF Joystick Systems Turning now to FIG. 7, additional examples of work vehicles into which embodiments of the MRF joystick system may be beneficially incorporated are illustrated. Specifically, and referring initially to the upper portion of this drawing figure, three such work vehicles are shown: a wheel loader 248, an SSL 250, and a motor grader 252. Addressing first the wheel loader 248, the wheel loader 248 may be equipped with an example MRF joystick device 254 located within the cabin 256 of the wheel loader 248. When provided, the MRF joystick device 254 may be utilized to control the movement of a FEL 258 terminating in a bucket 260; the FEL 258, and front end loaders generally, considered a type of "boom assembly" in the context of this document. Comparatively, two MRF joystick devices 262 may be located in the cabin 264 of the example SSL 250 and utilized to control not only the movement of the FEL 266 and its bucket 268, but further control movement of the chassis 270 of the SSL 250 in the well-known manner. Finally, the motor grader 252 likewise includes two MRF joystick devices 272 located within the cabin 274 of the motor grader 252. The MRF joystick devices 272 can be utilized to control the movement of the motor grader chassis 276 (through controlling a first transmission driving the motor grader rear wheels and perhaps a second (e.g., hydrostatic) transmission driving the forward wheels), as well as movement of the blade 278 of the motor grader; e.g., through rotation of and angular adjustments to the blade-circle assembly 280, as well as adjustments to the side shift angle of the blade 278.

In each of the above-mentioned examples, the host work vehicle is beneficially equipped with an MRF joystick system operable in one or more modified joystick stiffness modes suitable for assisting in operator in controlling the work vehicle at issue. Examples of such modified joystick stiffness modes, and associated joystick-controller work vehicle functions, have been described above including modified joystick stiffness modes well-suited for implementation in conjunction with wheel loaders, skid steer (and compact loaders), and motor graders (noting, for example, the above-described joystick stiffness modes adapted for improving controllability or joystick behavior during grading operations). Accordingly, any or all of the example wheel loader 248, the SSL 250, and the motor grader 252 can be equipped with a work vehicle MRF joystick system including at least one joystick device, an MRF joystick resistance mechanism, and a controller architecture. Finally, still further examples of work vehicles usefully equipped with embodiments of the MRF joystick systems described herein are illustrated in a bottom portion of FIG. 7 and include an FEL-equipped tractor 282, a feller-buncher 284, a skidder 286, a combine 288, and a dozer 290.

Enumerated Examples of the Work Vehicle MRF Joystick System

The following examples of the work vehicle MRF joystick system are further provided and numbered for ease of reference.

1. In embodiments, the work vehicle MRF joystick system includes a joystick device having a base housing, a joystick movably mounted to the base housing, and a joystick position sensor configured to monitor movement of the joystick relative to the base housing. An MRF joystick resistance mechanism is controllable to vary a joystick stiffness resisting movement of the joystick relative to the base housing in at least one degree of freedom, while a controller architecture is coupled to the joystick position sensor and to the MRF joystick resistance mechanism. The controller architecture is configured to: (i) selectively place the work vehicle MRF joystick system in a modified joystick stiffness mode during operation of the work vehicle; and (ii) when the work vehicle MRF joystick system is placed in the modified joystick stiffness mode, command the MRF joystick resistance mechanism to vary the joystick stiffness based, at least in part, on the movement of the joystick relative to the base housing.

2. The work vehicle MRF joystick system of example 1, wherein the controller architecture is configured to selectively place the work vehicle MRF joystick system based, at least in part, on a type of work implement attached to the work vehicle.

3. The work vehicle MRF joystick system of example 2, wherein the type of work implement assumes the form of a multi-function implement having first and second functions. Further, the controller architecture is configured to command the MRF joystick resistance mechanism to restrict joystick movement to first and second substantially linear tracks when the work vehicle MRF joystick system is placed in the modified joystick stiffness mode, with joystick movement along the first and second substantially linear tracks controlling the first and second functions of the multi-function implement, respectively.

4. The work vehicle MRF joystick system of example 1, wherein the joystick device includes at least one resilient element biasing the joystick to return to a center position when moved therefrom. The modified joystick stiffness mode is a joystick position hold mode in which the controller architecture commands the MRF joystick resistance mechanism to selectively increase the joystick stiffness in a manner preventing return of the joystick to the center position when the joystick is moved therefrom.

5. The work vehicle MRF joystick system of example 4, wherein the controller architecture is configured to place the work vehicle MRF joystick system in the modified joystick stiffness mode in response to operator input transitioning the work vehicle from a velocity-based joystick steering scheme to a position-based steering scheme.

6. The work vehicle MRF joystick system of example 1, wherein the work vehicle is operable in a multiple performance modes; while the controller architecture is configured to selectively place the work vehicle MRF joystick system in the modified joystick stiffness mode based, at least in part, on operator input data placing the work vehicle in a selected one of the multiple performance modes.

7. The work vehicle MRF joystick system of example 1, wherein the work vehicle is operable in a creep mode in which the joystick device can be utilized to control movement of the work vehicle at least in forward and rearward directions. Additionally, the controller architecture is configured to selectively place the work vehicle MRF joystick system in the modified joystick stiffness mode when the work vehicle is placed in the creep mode.

8. The work vehicle MRF joystick system of example 7, wherein, when the work vehicle MRF joystick system is placed in the modified joystick mode, the controller architecture: (i) commands the MRF joystick resistance mechanism to generate one or more MRF detents at one or more predetermined joystick positions; and (ii) selectively causes continued creep of the work vehicle in a forward or rearward direction based upon joystick movement relative to the one or more MRF detents.

9. The work vehicle MRF joystick system of example 1, wherein the controller architecture commands the MRF joystick resistance mechanism to generate one or more MRF detents at one or more predetermined joystick positions when the work vehicle MRF joystick system operates in a default joystick stiffness mode.

10. The work vehicle MRF joystick system of example 9, wherein controller architecture is further configured to: (i) command the MRF joystick resistance mechanism to generate the one or more MRF detents at a first force level when the work vehicle MRF joystick system operates in a default joystick stiffness mode; and (ii) command the MRF joystick resistance mechanism to generate the one or more MRF detents a second force level different than the first force level when the work vehicle MRF joystick system operates in a default joystick stiffness mode.

11. The work vehicle MRF joystick system of example 9, wherein the controller architecture is configured to control the MRF joystick resistance mechanism to suppress generation of the one or more MRF detents when the work vehicle MRF joystick system operates in a default joystick stiffness mode.

12. The work vehicle MRF joystick system of example 1, wherein the modified joystick stiffness mode assumes the form of a calibration mode during which a calibration process is carried-out. The controller architecture is configured to command the MRF joystick resistance mechanism to generate an MRF detent at a calibration position providing a tactile cue for an operator to maintain the joystick in the calibration position until completion of the calibration process.

13. The work vehicle MRF joystick system of example 1, further including a memory accessible to the controller architecture and storing an operator customization profile. The modified joystick stiffness mode assumes the form of an operator-customized stiffness mode, while the controller architecture is further configured to: (i) place the work vehicle MRF joystick system in the operator-customized stiffness mode in response to identification of an operator of the work vehicle associated with the operator customization profile; and (ii) when the work vehicle MRF joystick system is placed in the operator-customized stiffness mode, command the MRF joystick resistance mechanism to vary the joystick stiffness in accordance with the operator customization profile.

14. The work vehicle MRF joystick system of example 1, wherein the work vehicle includes an EH actuation system operable in modified EH control mode, such as a lift mode or a pressure boost mode. The controller architecture is configured to place the work vehicle MRF joystick system in the modified joystick stiffness mode in response to operator input activating the modified EH control mode.

15. The work vehicle MRF joystick system of example 1, wherein the joystick is rotatable relative to the base housing about a first axis and a second axis substantially perpendicular to the first axis. Additionally, the controller architecture commands the MRF joystick resistance mechanism to permit joystick movement over a full ROM when operating in a default joystick stiffness mode. Finally, when the work vehicle MRF joystick system is placed in the modified joystick stiffness mode, the controller architecture controls the MRF joystick resistance mechanism to selectively increase the joystick stiffness to confine joystick movement to a restricted ROM pattern including at least a first linear track.

CONCLUSION

The foregoing has thus provided work vehicle MRF joystick systems operable in modified joystick stiffness modes. Through the selective application of such modified joystick stiffness modes, the MRF joystick systems can provide additional functionalities or otherwise adapt joystick behavior through strategically-applied variations in MRF-applied resistive forces to enhance the manner in which operator interact with MRF joystick devices to control various work vehicle functions. As described above, embodiments of the MRF joystick system can be selectively placed in varying joystick stiffness modes in response to a wide range of conditions or trigger events; and, when operating in a particular joystick stiffness mode, variuos different aspects of joystick behavior can be altered through such variations in MRF-determined joystick stiffness. Such changes in joystick behavior may include alterations to the joystick ROM (e.g., selectively restricting the joystick to movement along a restricted ROM, such as a track pattern), variations in joystick stiffness when rotating a joystick about a particular axis or axes, and the presence (and intensity) of MRF detents. Operator convenience and overall work vehicle efficiency may be improved as a result.

As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A work vehicle magnetorheological fluid (MRF) joystick system for usage onboard a work vehicle, the work vehicle MRF joystick system comprising:
   a joystick device, comprising:
      a base housing;
      a joystick movably mounted to the base housing; and
      a joystick position sensor configured to monitor movement of the joystick relative to the base housing;
   an MRF joystick resistance mechanism controllable to vary a joystick stiffness resisting movement of the joystick relative to the base housing in at least one degree of freedom; and
   a controller architecture coupled to the joystick position sensor and to the MRF joystick resistance mechanism, the controller architecture configured to:
      selectively place the work vehicle MRF joystick system in a modified joystick stiffness mode during operation of the work vehicle; and
      when the work vehicle MRF joystick system is placed in the modified joystick stiffness mode, command the MRF joystick resistance mechanism to vary the joystick stiffness based, at least in part, on the movement of the joystick relative to the base housing;
      wherein the controller architecture commands the MRF joystick resistance mechanism to generate one or more MRF detents at one or more predetermined joystick positions when the work vehicle MRF joystick system operates in a default joystick stiffness mode.

2. The work vehicle MRF joystick system of claim 1, wherein the controller architecture is configured to selectively place the work vehicle MRF joystick system in the modified joystick stiffness mode based, at least in part, on a type of work implement attached to the work vehicle.

3. The work vehicle MRF joystick system of claim 2, wherein the type of work implement comprises a multi-function implement having first and second functions; and
   wherein the controller architecture is configured to command the MRF joystick resistance mechanism to restrict joystick movement to first and second substantially linear tracks when the work vehicle MRF joystick system is placed in the modified joystick stiffness mode, the joystick movement along the first and second substantially linear tracks controlling the first and second functions of the multi-function implement, respectively.

4. The work vehicle MRF joystick system of claim 1, wherein the joystick device comprises at least one resilient element biasing the joystick to return to a center position when the joystick is moved therefrom; and
   wherein the modified joystick stiffness mode comprises a joystick position hold mode in which the controller architecture commands the MRF joystick resistance mechanism to selectively increase the joystick stiffness in a manner preventing return of the joystick to the center position when the joystick is moved therefrom.

5. The work vehicle MRF joystick system of claim 4, wherein the controller architecture is further configured to place the work vehicle MRF joystick system in the modified joystick stiffness mode in response to operator input transitioning the work vehicle from a velocity-based joystick steering scheme to a position-based joystick steering scheme.

6. The work vehicle MRF joystick system of claim 1, wherein the work vehicle is operable in multiple performance modes; and
   wherein the controller architecture is configured to selectively place the work vehicle MRF joystick system in the modified joystick stiffness mode based, at least in part, on operator input data placing the work vehicle in a selected one of the multiple performance modes.

7. The work vehicle MRF joystick system of claim 1, wherein the work vehicle is operable in a creep mode in which the joystick device can be utilized to control movement of the work vehicle in at least forward and rearward directions; and
    wherein the controller architecture is configured to selectively place the work vehicle MRF joystick system in the modified joystick stiffness mode when the work vehicle is placed in the creep mode.

8. The work vehicle MRF joystick system of claim 1, wherein the controller architecture is further configured to:
    command the MRF joystick resistance mechanism to generate the one or more MRF detents at a first force level when the work vehicle MRF joystick system operates in the default joystick stiffness mode; and
    command the MRF joystick resistance mechanism to generate the one or more MRF detents at a second force level different than the first force level when the work vehicle MRF joystick system operates in the default joystick stiffness mode.

9. The work vehicle MRF joystick system of claim 1, wherein the controller architecture is configured to control the MRF joystick resistance mechanism to suppress generation of the one or more MRF detents when the work vehicle MRF joystick system operates in the default joystick stiffness mode.

10. The work vehicle MRF joystick system of claim 1, wherein a current speed of the work vehicle can be varied utilizing the joystick device; and
    wherein the controller architecture is further configured to:
    establish a target speed for the work vehicle based upon at least one performance parameter when the work vehicle MRF joystick system operates in the modified joystick stiffness mode; and
    command the MRF joystick resistance mechanism to vary the MRF joystick stiffness to provide tactile feedback through the joystick device indicating when the current speed of the work vehicle matches the target speed of the work vehicle.

11. The work vehicle MRF joystick system of claim 1, wherein the work vehicle comprises a grade control system and a blade positioned utilizing the joystick device; and
    wherein the controller architecture is configured to place the work vehicle MRF joystick system in the modified joystick stiffness mode when an operator controls the blade during a grading task carried-out utilizing the grade control system.

12. The work vehicle MRF joystick system of claim 1, further including a resilient element exerting a bias force on the joystick urging return of the joystick to a center position when displaced therefrom;
    wherein the controller architecture is configured to command the MRF joystick stiffness mechanism to:
    permit return of the joystick to the center position solely under the influence of the bias force when the work vehicle MRF joystick system operates in a first joystick stiffness mode; and
    prevent return of the joystick to the center position solely under the influence of the bias force when the work vehicle MRF joystick system operates in a second joystick stiffness mode.

13. A work vehicle magnetorheological fluid (MRF) joystick system for usage onboard a work vehicle, the work vehicle MRF joystick system comprising:
    a joystick device, comprising:
        a base housing;
        a joystick movably mounted to the base housing; and
        a joystick position sensor configured to monitor movement of the joystick relative to the base housing;
    an MRF joystick resistance mechanism controllable to vary a joystick stiffness resisting movement of the joystick relative to the base housing in at least one degree of freedom; and
    a controller architecture coupled to the joystick position sensor and to the MRF joystick resistance mechanism, the controller architecture configured to:
        selectively place the work vehicle MRF joystick system in a modified joystick stiffness mode during operation of the work vehicle; and
        when the work vehicle MRF joystick system is placed in the modified joystick stiffness mode, command the MRF joystick resistance mechanism to vary the joystick stiffness based, at least in part, on the movement of the joystick relative to the base housing;
    wherein the joystick is rotatable relative to the base housing about a first axis and a second axis substantially perpendicular to the first axis;
    wherein the controller architecture commands the MRF joystick resistance mechanism to permit joystick movement over a full range of motion (ROM) when operating in a default joystick stiffness mode; and
    wherein, when the work vehicle MRF joystick system is placed in the modified joystick stiffness mode, the controller architecture controls the MRF joystick resistance mechanism to selectively increase the joystick stiffness to confine joystick movement to a restricted ROM pattern comprising at least a first linear track.

14. The work vehicle MRF joystick system of claim 13, wherein the restricted ROM pattern comprises the first linear track and a second linear track along which joystick movement is permitted, the first linear track and the second linear track being substantially perpendicular and intersecting at a center position of the joystick.

15. A work vehicle magnetorheological fluid (MRF) joystick system for usage onboard a work vehicle, the work vehicle MRF joystick system comprising:
    a joystick device, comprising:
        a base housing;
        a joystick movably mounted to the base housing; and
        a joystick position sensor configured to monitor movement of the joystick relative to the base housing;
    an MRF joystick resistance mechanism controllable to vary a joystick stiffness resisting movement of the joystick relative to the base housing in at least one degree of freedom; and
    a controller architecture coupled to the joystick position sensor and to the MRF joystick resistance mechanism, the controller architecture configured to:
        selectively place the work vehicle MRF joystick system in a modified joystick stiffness mode during operation of the work vehicle; and
        when the work vehicle MRF joystick system is placed in the modified joystick stiffness mode, command the MRF joystick resistance mechanism to vary the joystick stiffness based, at least in part, on the movement of the joystick relative to the base housing;
    wherein the work vehicle is operable in a creep mode in which the joystick device can be utilized to control movement of the work vehicle in at least forward and rearward directions;
    wherein the controller architecture is configured to selectively place the work vehicle MRF joystick system in the modified joystick stiffness mode when the work vehicle is placed in the creep mode; and wherein, when the work vehicle MRF joystick system is placed in the modified joystick mode, the controller architecture:

commands the MRF joystick resistance mechanism to generate one or more MRF detents at one or more predetermined joystick positions; and selectively causes continued creep of the work vehicle in a forward or rearward direction based upon joystick movement relative to the one or more MRF detents.

16. A work vehicle magnetorheological fluid (MRF) joystick system for usage onboard a work vehicle, the work vehicle MRF joystick system comprising:

a joystick device, comprising:
a base housing;
a joystick movably mounted to the base housing; and
a joystick position sensor configured to monitor movement of the joystick relative to the base housing;

an MRF joystick resistance mechanism controllable to vary a joystick stiffness resisting movement of the joystick relative to the base housing in at least one degree of freedom; and a controller architecture coupled to the joystick position sensor and to the MRF joystick resistance mechanism, the controller architecture configured to:

selectively place the work vehicle MRF joystick system in a modified joystick stiffness mode during operation of the work vehicle; and when the work vehicle MRF joystick system is placed in the modified joystick stiffness mode, command the MRF joystick resistance mechanism to vary the joystick stiffness based, at least in part, on the movement of the joystick relative to the base housing;

wherein the modified joystick stiffness mode comprises a calibration mode during which a calibration process is carried-out; and wherein the controller architecture is configured to command the MRF joystick resistance mechanism to generate an MRF detent at a calibration position providing a tactile cue for an operator to maintain the joystick in the calibration position until completion of the calibration process.

17. A work vehicle magnetorheological fluid (MRF) joystick system for usage onboard a work vehicle, the work vehicle MRF joystick system comprising:

a joystick device, comprising:
a base housing;
a joystick movably mounted to the base housing; and
a joystick position sensor configured to monitor movement of the joystick relative to the base housing;

an MRF joystick resistance mechanism controllable to vary a joystick stiffness resisting movement of the joystick relative to the base housing in at least one degree of freedom;

a controller architecture coupled to the joystick position sensor and to the MRF joystick resistance mechanism, the controller architecture configured to:

selectively place the work vehicle MRF joystick system in a modified joystick stiffness mode during operation of the work vehicle; and when the work vehicle MRF joystick system is placed in the modified joystick stiffness mode, command the MRF joystick resistance mechanism to vary the joystick stiffness based, at least in part, on the movement of the joystick relative to the base housing; and a memory accessible to the controller architecture and storing an operator customization profile;

wherein the modified joystick stiffness mode comprises an operator-customized stiffness mode; and wherein the controller architecture is further configured to:

place the work vehicle MRF joystick system in the operator-customized stiffness mode in response to identification of an operator of the work vehicle associated with the operator customization profile; and when the work vehicle MRF joystick system is placed in the operator-customized stiffness mode, command the MRF joystick resistance mechanism to vary the joystick stiffness in accordance with the operator customization profile.

18. A work vehicle magnetorheological fluid (MRF) joystick system for usage onboard a work vehicle, the work vehicle MRF joystick system comprising:

a joystick device, comprising:
a base housing;
a joystick movably mounted to the base housing; and
a joystick position sensor configured to monitor movement of the joystick relative to the base housing;

an MRF joystick resistance mechanism controllable to vary a joystick stiffness resisting movement of the joystick relative to the base housing in at least one degree of freedom; and a controller architecture coupled to the joystick position sensor and to the MRF joystick resistance mechanism, the controller architecture configured to:

selectively place the work vehicle MRF joystick system in a modified joystick stiffness mode during operation of the work vehicle; and when the work vehicle MRF joystick system is placed in the modified joystick stiffness mode, command the MRF joystick resistance mechanism to vary the joystick stiffness based, at least in part, on the movement of the joystick relative to the base housing;

wherein the work vehicle comprises an electrohydraulic (EH) actuation system operable in a modified EH control mode, the modified EH control mode comprising a lift mode or a pressure boost mode; and wherein the controller architecture is configured to place the work vehicle MRF joystick system in the modified joystick stiffness mode in response to operator input activating the modified EH control mode.

19. A work vehicle magnetorheological fluid (MRF) joystick system for usage onboard a work vehicle, the work vehicle MRF joystick system comprising:

a joystick device, comprising:
a base housing;
a joystick movably mounted to the base housing; and
a joystick position sensor configured to monitor movement of the joystick relative to the base housing;

an MRF joystick resistance mechanism controllable to vary a joystick stiffness resisting movement of the joystick relative to the base housing in at least one degree of freedom; and a controller architecture coupled to the joystick position sensor and to the MRF joystick resistance mechanism, the controller architecture configured to:

selectively place the work vehicle MRF joystick system in a modified joystick stiffness mode during operation of the work vehicle; and when the work vehicle MRF joystick system is placed in the modified joystick stiffness mode, command the MRF joystick resistance mechanism to vary the joystick stiffness based, at least in part, on the movement of the joystick relative to the base housing;

wherein the work vehicle comprises a grade control system and a blade positioned utilizing the joystick device;

wherein the controller architecture is configured to place the work vehicle MRF joystick system in the modified joystick stiffness mode when an operator controls the blade during a grading task carried-out utilizing the grade control system;

wherein, when the work vehicle MRF joystick system operates in the modified joystick stiffness mode, the controller architecture commands the MRF joystick resistance mechanism to vary one or more of joystick stiffness characteristics relative to operation in a default joystick stiffness mode; and wherein the one or more joystick stiffness characteristics comprise: (i) changing a range of motion of the joystick, (ii) suppressing the generation of one or more MRF detents, and (iii) removing a float function of the blade.

* * * * *